(12) United States Patent
Xu

(10) Patent No.: US 11,250,507 B2
(45) Date of Patent: Feb. 15, 2022

(54) TRUSTED TOKENIZED TRANSACTIONS IN A BLOCKCHAIN SYSTEM

(71) Applicant: APIFINY GROUP INC., New York, NY (US)

(72) Inventor: Maodong Xu, Menlo Park, CA (US)

(73) Assignee: APIFINY GROUP INC., New York, NY (US)

( * ) Notice: Subject to any disclaimer, the term of this patent is extended or adjusted under 35 U.S.C. 154(b) by 0 days.

(21) Appl. No.: 16/404,709

(22) Filed: May 6, 2019

(65) Prior Publication Data

US 2020/0265516 A1    Aug. 20, 2020

Related U.S. Application Data

(60) Provisional application No. 62/808,201, filed on Feb. 20, 2019.

(51) Int. Cl.
*G06Q 40/00* (2012.01)
*G06Q 40/04* (2012.01)
*H04L 9/06* (2006.01)
*G06Q 20/38* (2012.01)

(52) U.S. Cl.
CPC ......... *G06Q 40/04* (2013.01); *G06Q 20/3821* (2013.01); *G06Q 20/3823* (2013.01); *G06Q 20/3827* (2013.01); *H04L 9/0637* (2013.01)

(58) Field of Classification Search
CPC .............................. G06Q 40/00; H04L 9/3247
USPC .......................................................... 705/37
See application file for complete search history.

(56) References Cited

U.S. PATENT DOCUMENTS

| 10,250,395 | B1 * | 4/2019 | Borne-Pons .......... H04L 9/3247 |
| 2018/0204190 | A1 * | 7/2018 | Moy ................... G06Q 20/0453 |
| 2019/0028276 | A1 | 1/2019 | Pierce et al. |
| 2019/0036932 | A1 | 1/2019 | Bathen et al. |
| 2019/0081789 | A1 | 3/2019 | Madisetti et al. |

\* cited by examiner

*Primary Examiner* — Ojo O Oyebisi
(74) *Attorney, Agent, or Firm* — Lewis Roca Rothgerber Christie LLP

(57) ABSTRACT

Embodiments relate to providing trusted tokenized transactions in a blockchain system. In one embodiment, a tokenization request may include identification information. A fiduciary server may apply a cryptographic private key to a hash of the identification information to generate a digital signature. An exchange server may cause a transmission of the digital signature to a blockchain. The blockchain includes a set of code instructions that verify the digital signature. The verification may include applying the public key corresponding to the cryptographic private key to decrypt the digital signature to re-generate the hash of the identification information. The hash may ensure the integrity of the identification information. The code instructions recorded on the blockchain, when executed, cause a computer to generate a blockchain unit. The tokenized transactions are traceable to the digital signature of the fiduciary server. This may provide a trusted transaction for users of the blockchain regarding the tokenized transactions.

19 Claims, 9 Drawing Sheets

TRUSTED TOKENIZED TRANSACTIONS IN A BLOCKCHAIN SYSTEM

CROSS-REFERENCE TO RELATED APPLICATION

The present application claims the benefit of U.S. Provisional Patent Application 62/808,201, filed on Feb. 20, 2019, which is hereby incorporated by reference in its entirety.

TECHNICAL FIELD

The disclosure generally relates to providing trusted tokenized transactions in a blockchain system, and in particular to, generating trusted blockchain units through instruction codes stored on a blockchain.

BACKGROUND

A blockchain may include a chain of data blocks that are linked together through hashes of previous blocks. The transactions stored in an intermediate block is often immutable. Various participants in the blockchain may independently verify the validity of a transaction by tracing through the history of the chain of transactions. In a public blockchain, different parties may independently verify the blocks recorded on the chain so that it becomes very challenging for a single party to manipulate or forge a transaction stored in a block. A blockchain often provides greater transparency, enhanced security, and improved traceability than a centralized system.

Through a blockchain system, a wide variety of blockchain units such as tokens that can be exchanged through the distributed ledger system of the blockchain may be generated. The generation of a blockchain unit may depend on the conditions that are initially set by the issuer of the blockchain unit. While participants of a blockchain may verify the validity of individual transactions, the initial generation of the blockchain units may be subject to various conditions that are not necessarily trusted.

SUMMARY

Embodiments relate to providing trusted tokenized transactions through a blockchain system. In generating trusted blockchain units through instruction codes stored in a blockchain, a fiduciary server may trigger the code instructions through a data feed. In one embodiment, a tokenization request may include identification information. A fiduciary server may apply a cryptographic private key to a hash of the identification information to generate a digital signature. An exchange server may cause a transmission of the digital signature to a blockchain. The blockchain includes a set of code instructions that verify the digital signature. The verification may include applying the public key corresponding to the cryptographic private key to decrypt the digital signature to re-generate the hash of the identification information. The hash may ensure the integrity of the identification information. The code instructions recorded on the blockchain, when executed, cause a computer to generate a blockchain unit. In some embodiments, the tokenized transactions may be traceable to the digital signature of the fiduciary server. This may provide a proof of trust for users of the blockchain regarding the tokenized transactions.

Figure 1:
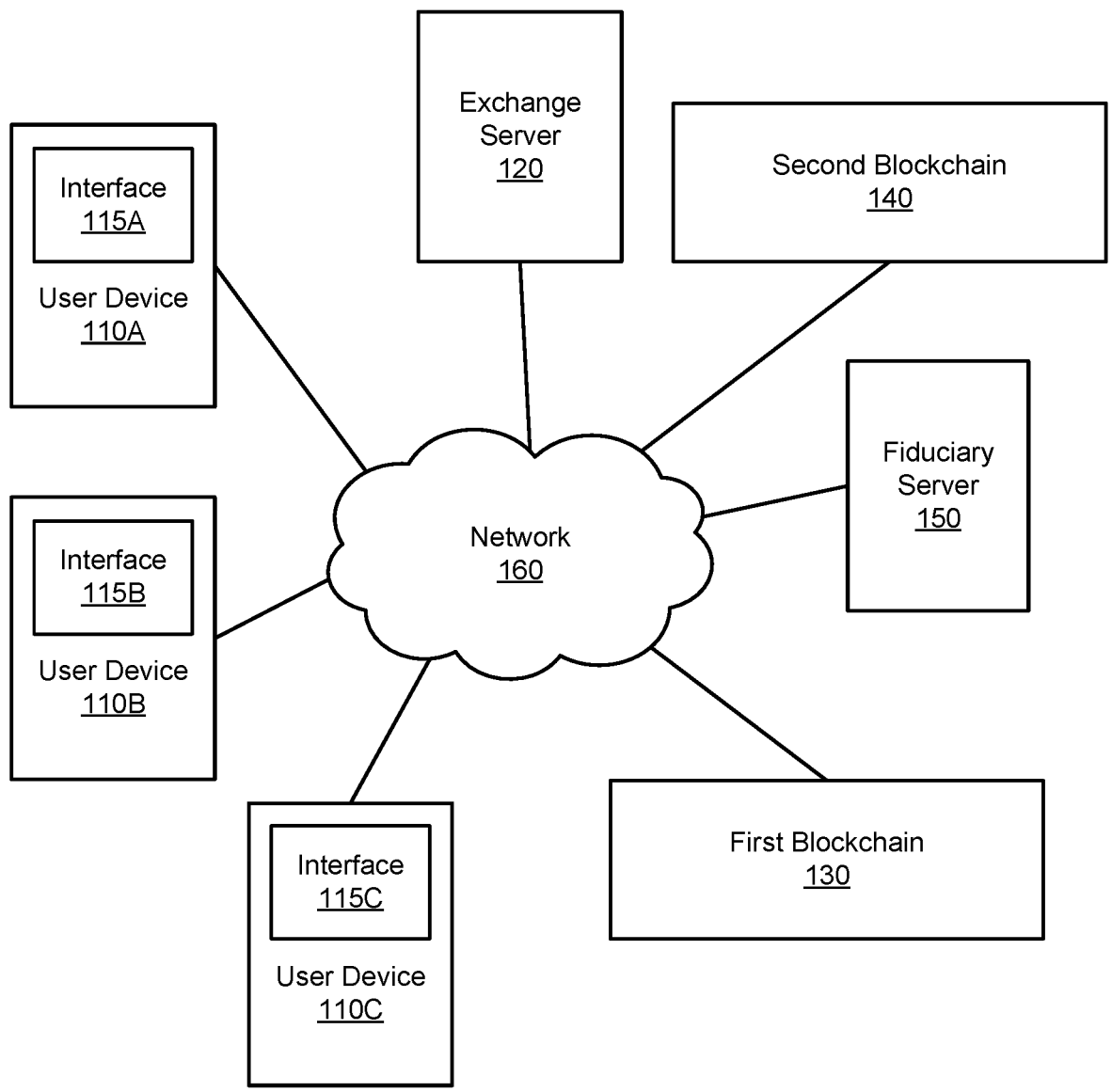
FIG. 1 illustrates an example blockchain exchange server system environment, in accordance with an embodiment.

The figures depict, and the detail description describes, various non-limiting embodiments for purposes of illustration only.

DETAILED DESCRIPTION

The figures (FIGs.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

In one embodiment, a computer-implemented method may include receiving, from a user of an exchange server, a tokenization request for tokenizing a quantity of a security. The method may also include causing a generation of a digital signature of a fiduciary using a cryptographic private key of the fiduciary. The digital signature may be derived from identification information of the tokenization request. The identification information may include an identifier of the security. The digital signature may represent that the fiduciary holds the quantity of the security in trust. The method may further include causing a transmission of the digital signature to a smart contract recorded on a first blockchain. The smart contract may include code instructions that are executable responsive to verifying the digital signature. The code instructions, when executed, may cause a computer to generate a blockchain depository receipt representing the security. The blockchain depository receipt is exchangeable by the user through the exchange server.

In one embodiment, a computer-implemented method performable by an exchange serve may include providing pricing information of a security in a unit of a blockchain token. The computer-implemented method may also include receiving a sell order from a first user of the exchange server, the sell order specifying a blockchain depository receipt to be sold. The blockchain depository receipt may be recorded on a first blockchain and generated by an execution of code instructions of a smart contract that is recorded on the first blockchain. The execution of the code instructions may be triggered by a fiduciary providing a confirmation to the smart contract that the fiduciary holds a quantity of the security in trust. The computer-implemented method may further include receiving a purchase order from a second user of the exchange server, the purchase order specifying a quantity of the blockchain token. The computer-implemented method may further include matching the sell order and the purchase order. The computer-implemented method may further include exchanging ownerships of the blockchain depository receipt and the quantity of blockchain token.

In one embodiment, a system may include an exchange server. The exchange server may be configured to receive a tokenization request for tokenizing a quantity of a security from a user of the exchange server. The exchange server may also be configured to cause a generation of a digital signature of a fiduciary, the generation of the digital signature comprising applying a cryptographic private key of the fiduciary to identification information of the tokenization request, the identification information comprising an identifier of the security, the digital signature representing that the fiduciary holds the quantity of the security in trust. The system may also include a blockchain that may include a block recording a smart contract. The smart contract may include code instructions that are executable responsive to verifying the digital signature transmitted from the fiduciary. The code instructions, when executed, may cause a computer to generate a blockchain depository receipt representing the security. The blockchain depository receipt may be exchangeable by the user through the exchange server.

System Overview

Referring now to FIG. (Figure) 1, a block diagram that illustrates an embodiment of an example blockchain system environment 100 is shown, in accordance with an embodiment. By way of example, the blockchain system environment 100 includes one or more user devices, e.g., 110A, 110B, 110C, etc. (collectively referred to as user devices 110 or a user device 110), an exchange server 120, one or more blockchains 130 and 140, and a fiduciary server 150. The entities and components in the environment 100 communicate with each other through the network 160. In various embodiments, the blockchain system environment 100 may include different, fewer, or additional components. The components in the blockchain system environment 100 may each correspond to a separate and independent entity or may be controlled by the same entity. For example, in one embodiment, the exchange server 120 may include the fiduciary server 150 and both servers may be controlled and operated by the same entity. In another embodiment, the fiduciary server 150 is separate from and independent of the exchange server 120. In some cases, some of the components in the environment 100 may communicate to each other through local network connections.

A user device 110 may be controlled by a user having an account of the exchange server 120. The user devices 110 may be any computing device. Examples of user devices 110 include personal computers (PC), desktop computers, laptop computers, tablet computers, smartphones, wearable electronic devices such as smartwatches, or any other suitable electronic devices. A user may have different types of accounts of the exchange server 120, including a security account, a physical asset account, a blockchain account, etc.

The user devices 110A, 110B, and 110C each may include an interface 115A, 115B, or 115C (collectively referred to as interfaces 115 or an interface 115). An interface 115 may communicate with the exchange server 120 and be run at a user device 110. When the user device 110 attempts to initiate a transaction (e.g., a deposit request, a transfer request, a purchase order, a sell order, etc.), the user may communicate to the exchange server 120 through the interface 115. The interface 115 may take different forms. In one embodiment, the interface 115 is a software application interface that is provided and controlled by the exchange server 120. For example, the exchange server 120 may provide a front-end software application that can be displayed at a user device 110. In one case, the front-end software application is a software application that can be download and installed at user devices 110 for the user to initiate and manage transactions, check balances, and perform other related actions. In another case, the front-end software application takes the form of a webpage interface of the exchange server 120 that allows clients to manage their accounts through web browsers. The front-end software application may include a graphical user interface (GUI) that displays various information and graphical elements. In another embodiment, interface 115 may not include graphical elements but may communicate with the exchange server 120 via other suitable ways such as application program interfaces (APIs).

An exchange server 120 may be a centralized server that provides various exchange and asset management services to the users. The services provided by the exchange server 120 may include digital wallet, pricing information, asset exchange, trusted asset deposit, blockchain token trading, blockchain management, smart contract generation, and data feed. In one embodiment, the exchange server 120 may be partially centralized and partially de-centralized. For example, the services related to security pricing and exchange may be centralized. The exchange server 120 may also provide blockchain token transactions that are decentralized or that rely on a decentralized blockchain. The details of the operations and sub-components of the exchange server 120 will be further discussed in association with FIG. 2.

The system 100 may include one or more blockchains 130 and 140. The first blockchain 130 may be a public blockchain that is decentralized. A public blockchain network may include a plurality of nodes that cooperate to verify transactions and generate new blocks. In some implementations of a blockchain, the generation of a new block may also be referred to as a mining process. The first blockchain 140 may support smart contracts, which are set of code instructions that are executable when one or more conditions are met. When triggered, the set of code instructions may be executed by a computer such as a virtual machine of the blockchain. Here, a computer may be a single operation unit in a conventional sense (e.g., a single personal computer) or may be a set of distributed computing devices that cooperate to execute the code instructions (e.g., a virtual machine or a distributed computing system). The first blockchain 130 may be a blockchain that is developed by the exchange server 120 or may be an existing blockchain such as BITCOIN, ETHEREUM, EOS, NEO, CARDANO, STELLER, etc.

The second blockchain 140 may be similar to or different from the first blockchain 130. In one case, the first blockchain 130 may be an existing blockchain such as ETHEREUM and the second blockchain 140 may be a new blockchain developed by the exchange server 120. The second blockchain 140 may be private or public. A public second blockchain 140 may be a decentralized blockchain that generates new blocks through a mining process that are verifiable through distributed nodes. User devices 110 and the exchange server 120 may serve as nodes of the public blockchain. A private second blockchain 140 may be a centralized blockchain that is controlled and managed by the exchange server 120. In one embodiment, regardless of whether the second blockchain 140 is private or public, the second blockchain 140 may be constructed in a format that disallows cross-blockchain transactions so that the circulation of blockchain units generated on the second blockchain 140 is restricted within the second blockchain 140. The second blockchain 140 may also support smart contract. In various embodiments, the system 100 may include more than two blockchains.

The fiduciary server 150 is a server operated by a legally trusted entity that holds various assets as a trustee on behalf of beneficiaries. As it will be discussed in further details below in association with FIG. 4A through FIG. 5, as an asset is deposited to and held in trust by the fiduciary, the fiduciary server 150 generates a digital signature that serves as a proof of the asset being held in trust. In turn, either the exchange server 120 or the fiduciary server 150 causes a generation of a blockchain depository receipt through a smart contract recorded in a blockchain. The blockchain depository receipt may represent the asset and is tradable through the exchange server 120. The fiduciary may be a legally regulated entity under the trust law. In one embodiment, the fiduciary server 150 is part of the exchange server 120. In another embodiment, the fiduciary server 150 is operated by an independent entity separate from the entity operating the exchange server 120 and may have one or more accounts of the exchange server 120.

The communications among the user devices 110, the exchange server 120, the blockchains 130 and 140, and the fiduciary server 150 may be transmitted via a network 160, for example, via the Internet. In one embodiment, the network 160 uses standard communications technologies and/or protocols. Thus, the network 160 can include links using technologies such as Ethernet, 802.11, worldwide interoperability for microwave access (WiMAX), 3G, 4G, LTE, 5G, digital subscriber line (DSL), asynchronous transfer mode (ATM), InfiniBand, PCI Express Advanced Switching, etc. Similarly, the networking protocols used on the network 160 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 160 can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Example Exchange Server

Figure 2:
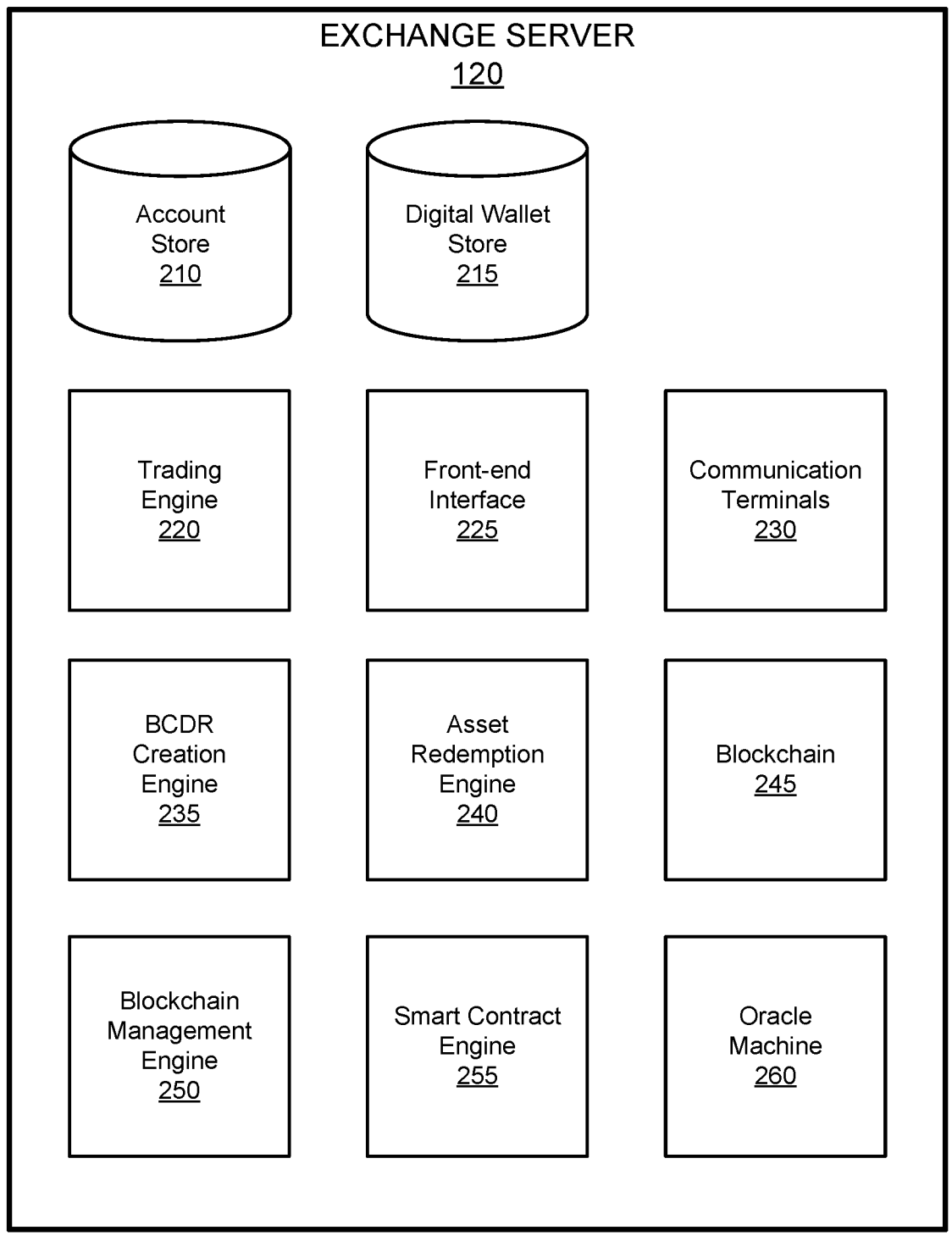
FIG. 2 is a block diagram illustrating various components of an exchange server, in accordance with an embodiment.

FIG. 2 is a block diagram representing an example exchange server 120, in accordance with an embodiment. In the embodiment shown in FIG. 2, the exchange server 120 includes an account store 210, a digital wallet store 215, a trading engine 220, a front-end interface 225, a communication terminal 230, a blockchain depository receipt (BCDR) creation engine 235, an asset redemption engine 240, a blockchain 245, a blockchain management engine 250, a smart contract engine 255, and an oracle machine 260. The functions of the exchange server 120 may be distributed among different components in a different manner than described. Also, in various embodiments, the exchange server 120 may include, different, fewer, and/or additional components.

According to one embodiment, the exchange server 120 may maintain user data in the account store 210. There can be different types of accounts for an end user using the exchange server 120. For example, a user may have a security account, a physical property account, a tokenized asset blockchain account, a blockchain cryptocurrency account, etc. In various embodiments, some accounts may be combined or separate. A security account may keep track of the user's holding of securities such as company stocks. A physical property account may keep track of the user's holding of physical properties such as precious metals, commodities, real properties, etc. A tokenized blockchain asset account may keep track of the user's holding of assets that are converted into blockchain units (e.g., blockchain tokens) or similar forms. For example, in one embodiment, the tokenized asset may take the form of a depository receipt that is tradeable through one or more blockchains. A blockchain cryptocurrency account may keep track of the user's balances of various cryptocurrencies such as BITCOIN, ETHER, RIPPLE, EOS and also cryptocurrency tokens that may be issued by the exchange server 120. In one embodiment, the exchange server 120 may assign a unique user identifier to a master user account that has different types of accounts. The exchange server 120 stores an association between the unique user identifier and each type of user account of the user. The exchange server 120 may also include a ledger system that keeps track of various balances as reflected in various record sources such as one or more blockchains.

The digital wallet store 215 stores various cryptocurrency balances of users. A digital wallet for a user may be a blockchain cryptocurrency account that stores the balances of various cryptocurrencies that are traded on different public blockchains. For each blockchain, the digital wallet may store a cryptographic private key for a user. The private keys for different blockchains may have different formats such as a different length of bits and may be in compliance with different cryptographic protocols. The private key allows the user to trade a cryptocurrency and proves that the user is the owner of a certain amount of cryptocurrency recorded on a blockchain. For example, the digital wallet maintains the private key as a secret of the user and may use the private key to derive a public key corresponding to the private key. The digital wallet may derive an address of the user for the blockchain from the public key. The address, which may be uniquely derived from the public key, may serve as a public yet anonymous identifier of the user in the blockchain. The digital wallet may use the private key to generate a digital signature to initialize a transaction of the cryptocurrency and use a form of the digital signature as a proof of the owner of the address. In some embodiments, the digital wallet may use a master private key to generate multiple public keys so that the user may use a different public address in each transaction on the blockchain.

The exchange server 120 may use the trading engine 220 to provide pricing information of tradable assets and also to match sell and purchase orders. Tradable assets, such as company stocks, may be traded on the exchange server 120 using fiat currencies in a conventional way. The tradable assets may also be tokenized and be traded on the exchange server 120 through one or more blockchains. The trading engine 220 provides pricing information of the assets such as bid prices and ask prices that are in various fiat currencies as well as in units of blockchain tokens. For example, the pricing information of a security may be presented in a unit of a blockchain token (e.g., ETHER) and in US dollars. The pricing information may be based on the purchase and sell orders placed by different users of the exchange server 120. In some cases, a sell order may be specified in a unit of a first blockchain token while a purchase order may be in a unit of a second blockchain token. The trading engine 220 may provide conversion rate information among different currencies (including fiat currencies and cryptocurrencies) and may automatically match orders that have equivalent values but in different currencies.

The exchange server 120 may include one or more front-end interfaces 225. A front-end interface 225 allows users to manage their accounts, initiate transactions such as by placing a purchase or sell order, and perform various blockchain related activities. A first example front-end interface 225 may be a software application interface that is installed on users' mobile devices such as smartphones and computers. A second example front-end interface 225 may be a webpage interface of the exchange server 120 that allows users to manage their accounts through web browsers. A third example front-end interface 225 may be an application program interface (API) of the exchange server 120 that allows users to initiate various transactions through program codes and algorithms.

The communication terminals 230 of the exchange server 120 provide network and blockchain connections between the exchange server 120 and various entities that communicate with the exchange server 120. The exchange server 120 may serve as a node of various public blockchains to participate in various mining and block validation processes. When the exchange server 120 initiates various through a blockchain, the communication terminal 230 may broadcast transactions using the public key of the exchange server 120 or the public key of users to the network of the blockchain for recordation. The broadcast transactions are recorded in one or more newly generated blocks in the blockchain and are verified after multiple subsequent blocks are linked to the block that records the transactions. The exchange server 120 may include different terminals such as blockchain terminal, trading webpage terminal, exchange server terminal, and fiduciary terminal. Each terminal may manage a data feed or a webpage that publishes information regarding the related services and server status. Each terminal may also include its individual API terminal.

The exchange server 120 serves as a trading platform of tradable assets (e.g., securities) that are tokenized as blockchain units. A quantity of a tradable asset (e.g., a certain share of company stock) may be represented by a blockchain depository receipt (BCDR) and be traded and transmitted through one or more blockchains. In some cases, the BCDR may also be referred to as a pass. For example, in one embodiment, a pass may be a type of BCDR whose exchange is restricted within the exchange server 120. In other embodiments, a pass may refer to another type of blockchain unit. The BCDR creation engine 235 causes a generation BCDRs by smart contracts in response to users' tokenization requests to convert tradable assets to blockchain units. To establish trust for various users that a BCDR truly represents the underlying quantity of a tradable asset, the BCDR creation engine 235 may cause a generation of a digital signature of a fiduciary. The generation of the digital signature may include applying a cryptographic private key of the fiduciary to the identification information of a tokenization request that includes an identifier of the tradable asset to be tokenized and the quantity of the tradable asset. The digital signature may represent and serve as proof that the fiduciary holds the quantity of the asset in trust. The BCDR creation engine may cause the digital signature to be transmitted to a smart contract recorded on a blockchain. The smart contract includes code instructions that are executable in response to verifying the digital signature. The code instructions, when executed, cause a computer to generate a BCDR. The BCDR is tradable by users through the exchange server such as by a blockchain of the exchange server.

The exchange server 120 may allow users to redeem tradable assets that are held in trust of a fiduciary. The asset redemption engine 240 may receive a BCDR from an owner. The transfer of the BCDR from the owner to the exchange server 120 may be performed through a ledger system of the exchange server 120 or through a recordation process of a blockchain. The asset redemption engine 240 transmits an equivalent quantity of the tradable asset represented by the BCDR to an account of the owner. The asset redemption engine 240 may then remove the BCDR by marking the identifier of the BCDR in a data store of the exchange server 120 as invalid or redeemed. In other cases, the asset redemption engine 240 may reduce a total amount of issuance of a BCDR of a particular asset. For example, the exchange server 120 may keep track of the issuance of a BCDR of a particular stock. When a quantity of the BCDR representing the stock is redeemed, the asset redemption engine 240 may reduce the amount of issuance. The removal of the BCDR may also be performed through a blockchain. For example, the asset redemption engine 240 may cause a smart contract to remove the BCDR from the blockchain or to mark the BCDR as removed in a block of the blockchain.

The blockchain 245 may be a public blockchain, a consortium blockchain, a private blockchain. The degree of decentralization of the blockchain 245 may vary in different embodiments. In one embodiment, the blockchain 245 may be a consortium blockchain. The exchange server 120 may serve as a node of the blockchain network and may limit other nodes of the blockchain network to users of the exchange server 120 and other authorized parties. Hence, the exchange server 120 may restrict the parties who can participate in the mining process and the data recordation and verification process of the blockchain 245. In another embodiment, the exchange server 120 may set the standard and publish the blockchain 245, but allows the public to freely participate in the blockchain network. In various embodiments, the exchange server 120 may decide to disallow cross-blockchain transactions for the blockchain 245. As a result, tokens, BCDRs, and other blockchain units that are traded on the blockchain 245 may be restricted to participants of the blockchain 245. In turn, the exchange server 120 may restrict the trading of the tokens and BCDRs to only users of the exchange server 120. In various embodiments, the blockchain 245 may correspond to the first blockchain 130 or the second blockchain 140 shown in FIG. 1.

Blockchain management engine 250 provides various functionalities for the exchange server 120 to perform activities on different blockchains that may have their own standards and protocols. The exchange server may serve as a node of a public blockchain to participate in the mining and data validation process. The blockchain management engine 250 may also allow exchange server 120 to broadcast various transactions to a blockchain network for recordation. In some cases, the blockchain management engine 250 may store various private keys of the exchange server 120 that allows the exchange server 120 to generate transactions for blockchain recordation and to accept a transfer of blockchain units through the exchange server's public address. The blockchain management engine 250 may also manage the broadcast of transactions that are initiated by the users of the exchange server 120. For example, the private keys of the user accounts may also be stored by the exchange server 120 so that the blockchain management engine 250 may broadcast transactions on behalf of the users. For some of the blockchains, the blockchain management engine 250 supports cross-chain activities and transactions.

The smart contract engine 255 manages the generation and triggering of various smart contracts that are recorded on different blockchains. A smart contract may be created through a particular programming language that is compatible with the blockchain. A smart contract may be recorded on a block of the blockchain. The recorded smart contract may include executable code instructions that are triggered by a certain condition. When the condition is met and verified, the code instructions are executed by a computer to automatically execute the contract terms that take the form of code instructions. The computer that executes the smart contract may take various forms. For example, a computer described herein may be a conventional personal computer, a virtual machine for the blockchain, or even a collection of distributed nodes in distributed computing. When the code instructions of the smart contract are executed, the code instructions may cause certain events (e.g., a transaction, a generation of a token, a generation of a BCDR) to be recorded on a blockchain. The smart contract engine 255 may generate different smart contracts to be recorded on blockchains. The smart contract engine 255 may also cause the triggering of various recorded smart contracts when conditions are met.

The oracle machine 260 may serve as a data feed for one or more smart contracts. The oracle machine 260 may receive different data from various sources. For example, different parties may provide information and data to the oracle machine 260. When relevant information is obtained by the oracle machine 260, some code instructions of the smart contract may be triggered if certain conditions are met.

Asset Deposit and Exchange Through Exchange Server

Figure 3:
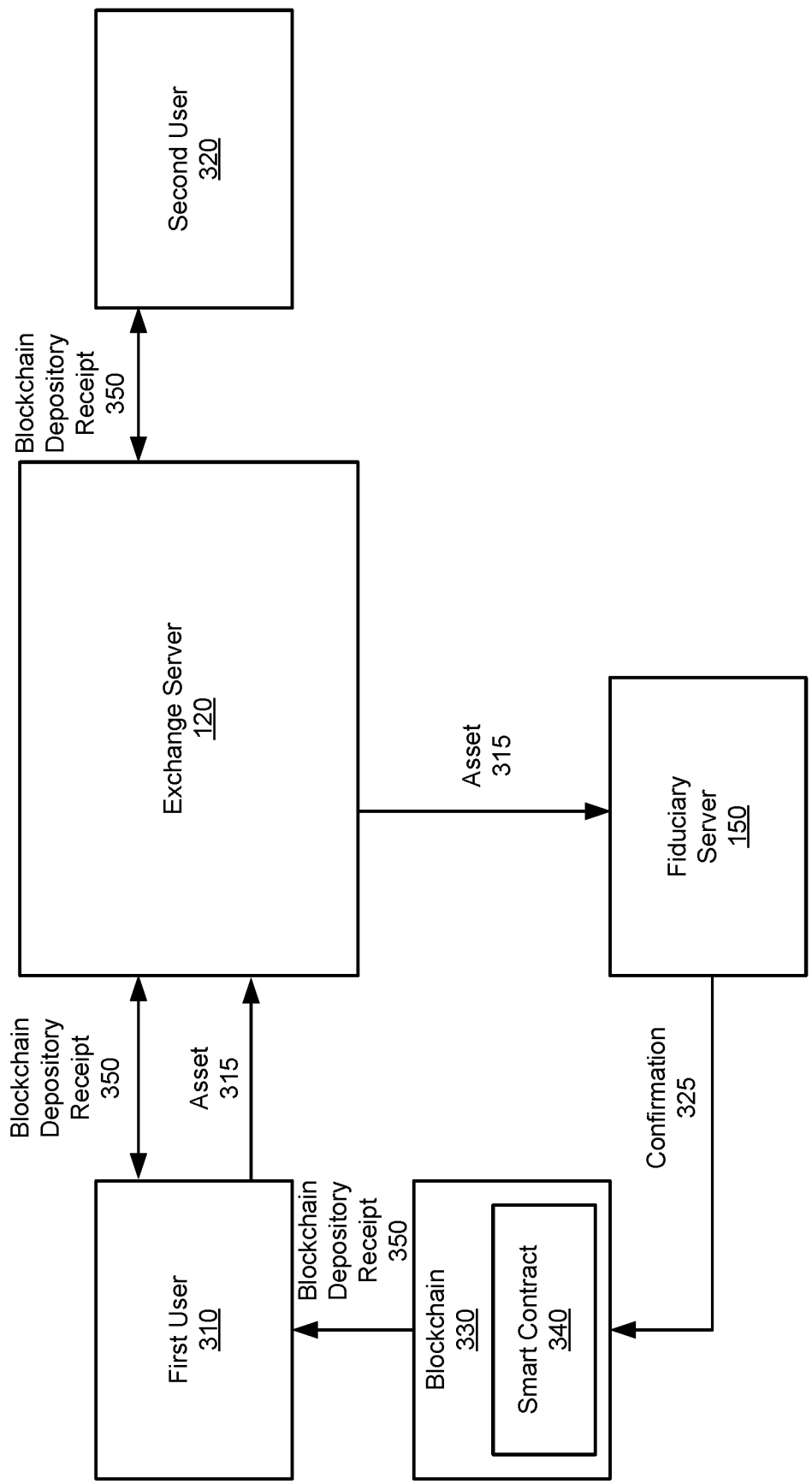
FIG. 3 is a block diagram illustrating an example architecture of asset tokenization and exchange process through an exchange server, in accordance with an embodiment.

FIG. 3 is a block diagram illustrating an example architecture of asset tokenization and exchange process through an exchange server 120, in accordance with an embodiment. The exchange server 120 may be in communication with one or more fiduciary servers 150 and multiple users. For simplicity, a single fiduciary server 150, a first user 310, and a second user 320 are shown in FIG. 3. In some embodiments, the fiduciary server 150 is part of the exchange server 120. In other embodiments, the fiduciary server 150 is a separate entity such as an independent third party that works with the exchange server such as by having accounts of the exchange server 120. The exchange server 120 allows users to deposit tradable assets to be held in trust by the fiduciary server 150. The fiduciary server 150 confirms that the tradable assets by different ways based on the nature of the assets. Either the exchange server 120 or the fiduciary server 150 causes a generation of a BCDR that represents the asset being held in trust. The users of the exchange server 120 may trade different BCDRs through the exchange server 120.

In one embodiment, an asset may be traded through the exchange server 120 by two different ways. First, the exchange server 120 may act as a conventional asset exchange server such as a stock exchange server for users. Second, the asset may be traded through a blockchain using a blockchain unit representing the asset. The blockchain unit may be referred to as a blockchain depository receipt. The users may request the asset such as a company stock to be tokenized so that the asset is tradable through the blockchain.

In tokenizing the asset, a first user 310 may initiate a tokenization request to put the asset 315 in trust. The exchange server 120 processes the tokenization request and works with the fiduciary server 150 to verify the ownership of the asset 315 and to complete the transfer of the ownership from the user 310 to the fiduciary server 150. Depending on the assets and the embodiments, the fiduciary server 150 may confirm that the asset 315 is held in trust before or after the settlement of the transfer. The exchange server 120 or the fiduciary server 150 may provide a confirmation 325 to a smart contract 340 that is stored on a blockchain 330. The smart contract 340 executes its code instructions and issues a BCDR, such as in the form of a blockchain unit that appears in one of the blockchain transactions. The BCDR 350 may be transferred to the first user through recordation of a transaction on the blockchain 330. The BCDR 350 serves as a representation of the asset 315 that is held in trust by the fiduciary server 150. The BCDR 350 is tradable on the exchange server 120 by the first user 310, the second user 320, etc.

The exchange server 120 may verify the user's ownership of the asset 315 differently based on the type of asset. Here, ownership may include both a direct ownership such as having a legal possession of the asset (e.g., having a title of a property, having a stock certificate under the user's name, or being registered as an owner of a company share) or an indirect ownership such as being a beneficiary owner of stocks that are legally held by a stock broker. If the asset is a security such as a company stock or a similar financial asset such as a bond, a mutual fund, an index fund, a REIT, a future, an option, a warrant, etc., the exchange server 120 may already have held the shares of the financial asset of the first user 310 in trust when the first user 310 requests to tokenize the asset. In such a case, the exchange server 120 may work directly with fiduciary server 150 in tokenizing the asset. In some cases, when the first user 310 requests for the deposit and tokenization of the asset, the asset may be held by a third-party broker. The exchange server 120 may request the third-party broker to transfer the ownership. If the asset is a physical property such as real property, the exchange server 120 may verify the ownership by having the first user 310 to upload the grant deed to the exchange server 120 and other identification documents or may verify through government's property records. If the asset is a precious metal, the exchange server 120 may verify the ownership by having the first user 310 to upload the title and provide the storage location of the precious metal to verify the ownership. In some cases, the first user 310 may own the metal in the form of a "paper" metal such as a future contract or a metal certificate. The exchange server 120 may verify the ownership in a way that is similar to verifying a security.

The way in which the exchange server 120 may transfer the ownership of the asset from the user 310 to the fiduciary server 150 may also depend on the type of asset. For example, for assets such as securities, funds, precious metal futures, the transfer may be achieved between a third-party broker and the exchange server 120 through a broker-tobroker transfer process. If the asset is real property or another similar property, the exchange server 120 or the fiduciary server 150 may open an escrow account, record a deed such as a grant deed, and settle the transaction through the escrow account. If the asset is a physical precious metal or another similar property, the exchange server 120 may need a physical delivery of the precious metal to a bank vault.

The timing of the fiduciary server 150 to send the confirmation 325 that causes a generation of the BCDR may depend on the embodiments and the nature of the asset. For a transfer of a security or other similar financial assets, the transfer process may include a transaction date and a settlement date. The settlement date may typically occur on the same day, a day after (T+1), two days after (T+2) of the transaction date. In one embodiment, the fiduciary server 150 by default may send the confirmation 325 to the smart contract 340 after the settlement date. In another embodiment, depending on the nature of the security and the source of the transfer, the confirmation 325 may be sent before the settlement date. For example, for large company stocks (e.g., S&P 500 company shares) and transfers from a reputable broker firm or for securities that are already held by the exchange server 120 (e.g., in the stock account of the first user 310), the exchange server 120 or the fiduciary server 150 may accelerate the process by sending the confirmation on the transaction date before the settlement. For assets such as real properties, the transmission of the confirmation 325 to the smart contract 340 may occur after the close of escrow. Likewise, for physical precious metals, the transmission of the confirmation 325 to the smart contract 340 may occur after the delivery of the metals.

After the smart contract 340 executes its code instruction to generate a BCDR 350, the generation of the BCDR 350 may be recorded on the blockchain 330. The delivery of the BCDR 350 to the first user 310 may occur in different ways in various embodiments. In one embodiment, the exchange server 120 may maintain a centralized ledger system that can credit the tokenized asset blockchain account of the first user 310 to reflect the delivery of the BCDR 350. In another case, the delivery of the BCDR 350 is performed through the blockchain 330. For example, the smart contract 340 may include code instructions that broadcast a blockchain transaction to the blockchain network for recordation. The blockchain transaction may specify a transfer of the BCDR 350 to a blockchain address of the first user 310 in the blockchain 330. The blockchain address may be a version of the public key of the first user 310.

The trading of the BCDR 350 can be performed in one or more different ways. The trading between the first user 310 and the second user 320 may be conducted using a blockchain token (e.g., a cryptocurrency) or using a fiat currency. In one embodiment, the exchange may be performed through a centralized manner by the exchange server 120. For example, the exchange server 120 may maintain a ledger system that maintains a record of balances of the accounts of the first user 310 and the second user 320. The exchange of ownership of the BCDR 350 and a quantity of the currency (e.g., a blockchain token) may include transferring the ownership to the BCDR 350 to the second user. In the ledger system, the exchange server 120 may debit a first account for the first user 310 with the BCDR 350 and credit the account with the quantity of the currency. The exchange server 120 may also credit a second account for the second user 320 with the BCDR 350 and debit the account with the quantity of the currency.

In yet another embodiment, the exchange of the BCDR 350 may be performed through a blockchain, which may be the blockchain 330 or another blockchain (not shown in FIG. 3). The exchange server 120, which manages the accounts for the first user 310 and second user 320, may hold the private keys for the user accounts. Using the private key of the user account of the first user 310, the server 120 may create a digital signature in a blockchain transaction and broadcast the blockchain transaction for recordation on the blockchain. The blockchain transaction specifies a transfer of the BCDR 350 from a first blockchain address of the first user 310 to a second blockchain address of the second user 320. After the blockchain transaction is recorded and multi-verified (e.g., a few new blocks are added to the block that records the blockchain transaction), the transaction is settled and the exchange server 120 shows the balance changes in the accounts of the two users.

Example Tokenization Processes

Figure 4A:
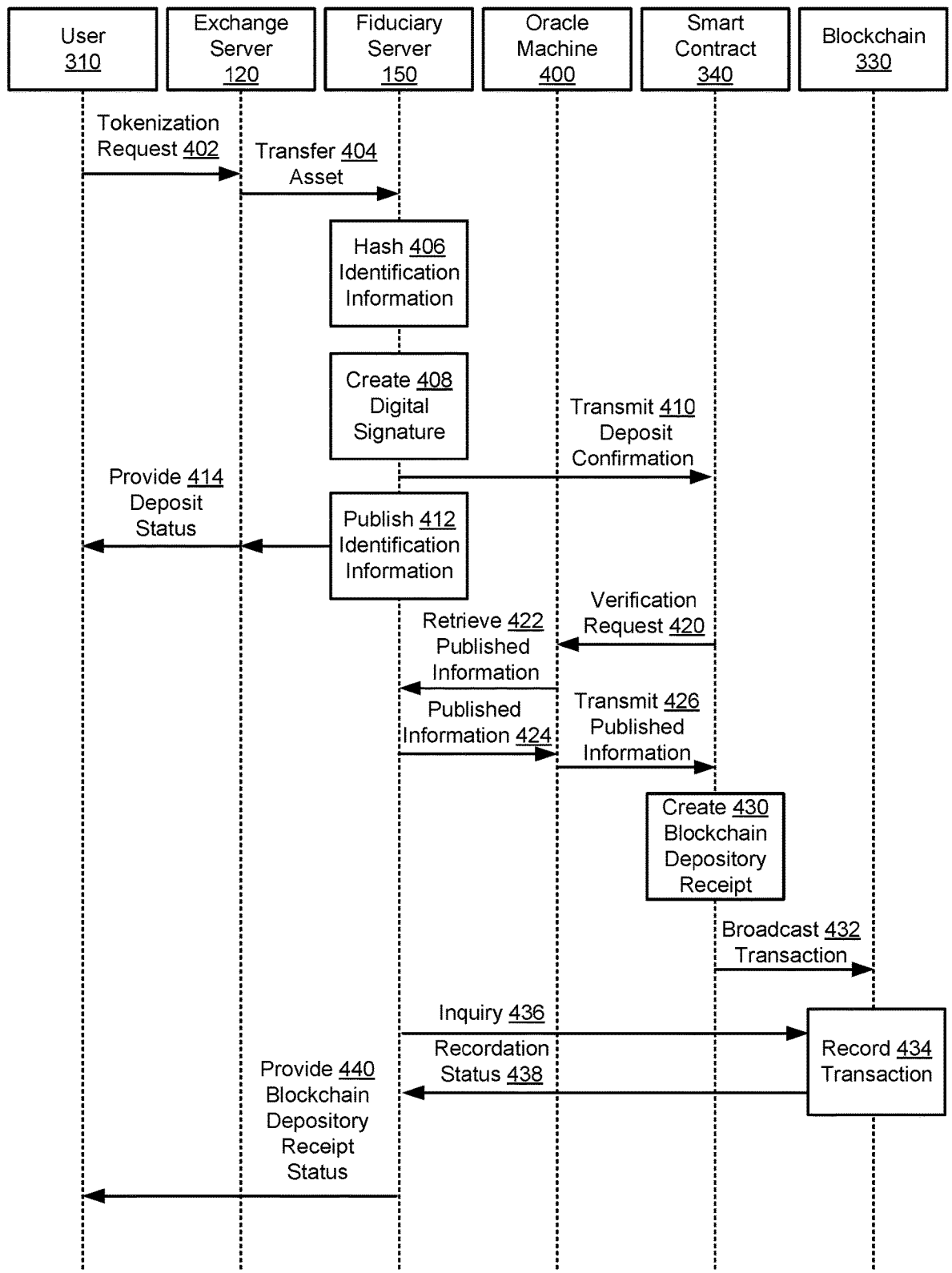
FIG. 4A is a flowchart depicting an example process of tokenizing an asset, in accordance with an embodiment.

FIG. 4A is a flowchart depicting an example process of tokenizing an asset, in accordance with an embodiment. In general, the exchange server 120 receives, from a user 310, a tokenization request for tokenizing a quantity of an asset such as a security. The exchange server 120 (or the fiduciary server 150) causes a generation of a digital signature of the fiduciary server 150. In turn, the exchange server 120 (or the fiduciary server 150) causes a transmission of the digital signature to a smart contract recorded on a blockchain to trigger a generation of the BCDR.

A user 310 of the exchange server 120 may create an account with the exchange server 120 before the process of tokenizing an asset. The user 310 may initiate a deposit request and complete a transfer of the asset to the account of the exchange server 120. In one embodiment, the transfer of the asset occurs before a tokenization request 402 is sent. In another embodiment, the transfer of the asset occurs along with the deposit request 402. Depending on the nature of the asset, the exchange server 120 may obtain the title and ownership of the asset directly from the user 310, from a third-party broker that manages the asset for the user 310, or from another suitable source.

In a tokenization process, the exchange server 120 receives a tokenization request 402 from the user 310. The tokenization request may include a value specifying the request and may include additional information such as an identifier of the asset such as a stock symbol and the quantity of the asset. In response, the exchange server 120 withholds the asset from the user account of user 310 and transfers 404 the asset to the fiduciary server 150. The exchange server 120 may also transfer the tokenization request 402 and a unique identifier of the account of the user 310 to the fiduciary server 150. The unique account identifier may be an identifier used by the exchange server 120 to identify the user account. Example unique account identifier may include the user account's public blockchain address, a version of the user account's public key, a hash of the user account name, the account name itself, or any other suitable unique identifier. For example, a version of the user account's public key may be an encoded version of the public key or a variation of the public key. The public key may be hashed, checksumed, supplemented with header, etc.

The fiduciary server 150 may begin its procedure in the tokenization process in response to receiving the tokenization request. The fiduciary server 150 receives identification information of the tokenization request 402. The identification information of the tokenization request may include the asset identifier, the quantity of the asset, the unique account identifier, a timestamp of the tokenization request, etc. In various embodiments, the identification information may include different, fewer, or additional information. The fiduciary server 150 may hash 406 the identification information to create a hashed information. The hashing process may include applying a one-way function to the identification information to fixed-length hash. Common hashing algorithms such as secure hash algorithms (SHA) or message digest algorithms (MD) may be used. The hashing process may also include creating a checksum, encoding some of the bits, adding prefixes or suffixes, etc. The hashed information is a fingerprint of the identification information of the tokenization request. In some embodiments, the hashed information may be referred to as a deposit fingerprint for this particular tokenization process.

The fiduciary server 150 may create 408 a digital signature that is derived from the identification information of the tokenization request using a cryptographic private key of the fiduciary server 150. Either the exchange server 120 or the fiduciary server 150 may cause the fiduciary server 150 to create the digital signature. Although the digital signature is derived from the identification information, this does not necessarily mean that the digital signature is generated directly from the identification information. In one embodiment, the fiduciary server 150 applies its private key directly to the identification information to generate the digital signature through an encryption algorithm. In another embodiment, the fiduciary server 150 applies its private key to the hashed information (e.g., the deposit fingerprint) instead to generate the digital signature. Since the hashed information is derived from the identification information, the digital signature is still derived from the identification information. The created digital signature represents that the fiduciary server 150 holds the quantity of the asset in trust. The integrity of the identification information can be verified by any parties using the digital signature. In some embodiments, the deposit of the asset to a trusted fiduciary is complete after the fiduciary server 150 confirms such deposit by generating the digital signature.

The fiduciary server 150, or the exchange server 120, may cause a transmission 410 of a confirmation of the deposit to a smart contract 340 that is recorded on a blockchain 330. The confirmation may be the digital signature itself or may include the digital signature. The transmission 410 of the confirmation may trigger the smart contract 340 to execute some parts of its code instructions. In some cases where the type of asset to be tokenized is new to the exchange server 120, the exchange server 120 may also create a new smart contract and record the smart contract on the blockchain 330 before the confirmation is transmitted to the smart contract.

The fiduciary server 150 may also publish 412 some of the identification information of the tokenization request on a source that is separated from the blockchain 330. For example, the fiduciary server 150 may publish 412 some of the identification information on a website (e.g., the website of the fiduciary server 150) or otherwise make the information available through an API. The web publication (whether it is a website or an API source) serves as an independent source regarding the deposit activities at the fiduciary server 150. The published information may be anonymized. For example, in one embodiment, the unique account identifier of the user 310 and other information regarding the user initiating the tokenization process may be removed from the publication. Additionally, or alternatively, the substantive data of the identification information may be hashed. The published information may include the asset identifier, the quantity of the asset that is held in trust by the fiduciary in this deposit, the timestamp of the deposit, and the hash. In another embodiment, the fiduciary server 150 uses zero-knowledge proof to publish a proof of the possession of the information instead of the actual underlying information. Retrieving the published information, the exchange server 120 may provide 414 a deposit status to the user 310 to indicate that the asset has successfully been held in trust by the fiduciary server 150.

Responsive to receiving a deposit confirmation from either the fiduciary server 150 or the exchange server 120, the smart contract 340 may verify the deposit confirmation. The verification process may vary in different embodiments. In embodiments shown in FIG. 4A, the smart contract 340 carries out a two-step verification process. First, responsive to the receipt of the deposit confirmation which may include a digital signature of the fiduciary server 150, the smart contract 340 decrypts the digital signature using the public key of the fiduciary server 150 to re-generate a version of the identification information. The smart contract 340 compares the decrypted information to the identification information of the tokenization request to see if the quantity of the asset, the asset identifier, the user's unique account identifier, or the timestamp in two sources matches. The version of the identification information may be the identification information itself, an extracted version of the identification information, or a hash of the identification information. Hence, in one embodiment, the comparison is conducted by a direct comparison between the decrypted information and the identification information. In another embodiment, the decrypted information may be a hash so that the smart contract 340 compares whether the hash of the identification information and the decrypted information match.

In a second step of verification, the smart contract 340 may send a verification request 420 to an oracle machine 400 that serves as the data feed for the smart contract 340. The oracle machine 400 retrieves 422 published information from a publication source such as from the web publication of the fiduciary server 150. The publication source is separated from the blockchain 330. Depending on the embodiments, the published information 424 may or may not be encrypted. The oracle machine 400 may receive the published information through a push or pull mechanism. The published information may be transmitted 426 to the smart contract 340. The smart contract 340 verifies the digital signature by comparing the decrypted information in the digital signature to the published information (e.g., asset quantity, asset identifier, timestamp, etc.). If the information in different sources matches, the code instruction in the smart contract causes the computer to generate a BCDR that is recorded on the blockchain 330. In other words, the web publication of the fiduciary server 150 may serve as a second source of information for the verification that the fiduciary server 150 has held the asset in trust.

In other embodiments, instead of a two-step verification, the smart contract 340 may verify the digital signature in other suitable ways. For example, the smart contract 340 may conduct a single step verification that decrypts the digital signature and compares the decrypted message to the identification information. Other suitable verification processes are also possible.

The smart contract 340 includes code instructions that are executable responsive to verifying the digital signature. The code instructions, when executed, cause a computer to create 430 a BCDR that represents the asset. The BCDR may represent a quantity of the asset that is held in trust by the fiduciary server 150. The code instructions of the smart contract 340 may cause the creation of BCDR to be recorded on the blockchain 330. The exact content of a BCDR may vary in different embodiments. In one embodiment, the BCDR may include a header and a message body that may include identification information of the asset and the fiduciary that stores the asset. In another embodiment, the BCDR may not include any information and may simply be a traceback of a blockchain transaction that generates the BCDR.

In various embodiments, the BCDR may be delivered to the user 310 in different manners. In one embodiment, the exchange server 120 may include a centralized ledger system. To deliver the BCDR, the exchange server 120 associates the BCDR with the account of the user 310 so that the account shows a balance of the BCDR.

In another embodiment, the BCDR may be delivered to the user 310 through the blockchain 330. The code instructions of the smart contract 340 may further cause a computer to broadcast 432 a blockchain transaction for recordation on the blockchain 330. The blockchain transaction specifies a transfer of the BCDR to a blockchain address of the user 310 in the blockchain 330. The blockchain 330, through the mining process, records the transaction in one of the blocks. The fiduciary server 150 or the exchange server 120 may inquire 436 about the recordation status on the blockchain 330. The fiduciary server 150 or the exchange server 120 may retrieve a recordation status 438 from the blockchain 330 by, for example, scanning through different newly generated blocks on the blockchain 330. The exchange server 120 may deem the recordation as settled after there are multiple subsequent blocks that are linked to the block that records the transaction. The exchange server 120 may provide 440 a status regarding the transfer of the BCDR to the user 310.

Different kinds of blockchain 330 may be used in various embodiments. In one embodiment, the blockchain 330 may be a public blockchain such as an existing blockchain like ETHEREUM. The BCDR may take the form of a blockchain token that is tradable through various kinds of blockchains. In another embodiment, the blockchain 330 maybe a blockchain whose standards are set by the exchange server 120. The blockchain may not allow a cross-chain activity with respect to certain types of BCDRs. As a result, the BCDRs may be traded only on the blockchain 330. The exchange server 120 may further restrict the participants of the blockchain 330 to the users of the exchange server 120. As such, in some embodiments, the BCDRs may only be traded within the exchange server 120.

In one embodiment, how the BCDRs may be traded may be defined by the smart contract 340. The smart contract 340 may define different classes of blockchain units (e.g., different types of BCDRs) in its code instructions. Based on different situations, a particular type of BCDR may be issued and recorded in the blockchain 330. The smart contract 340 may define one or more namespaces in the classes of blockchain units. One of the namespace may be reserved for the exchange server 120 so that a BCDR issued under the namespace is only tradable through the exchange server 120. Similar to a website domain on the Internet, the namespace specified by the smart contract 340 and used on the blockchain 330 may be unique on the blockchain 330. The exchange server 120 may register one or more namespaces. For example, the exchange server 120 may have different namespaces for different types of BCDRs that represent various assets. For a namespace that is registered by the exchange server 120, any BCDRs issued under the namespace through the smart contract 340 may include the namespace convention and may be only valid at the exchange server 120. When the BCDR is created under such a namespace, the BCDR may be traded only through the exchange server 120 because other exchange servers may not have the access permission of the namespace. In another embodiment, a BCDR may be issued without a specific namespace so that the BCDR is tradable through more than one exchange server.

An example of a blockchain unit class that may be recorded in a smart contract's code instruction is shown below:

```
#include <dcclib/token.hpp> // Token usage
......
namespace AE {
    void token::create( account_name issuer,
        asset           maximum_supply,
        uint8_t         issuer_can_freeze,
        uint8_t         issuer_can_recall,
        uint8_t         issuer_can_whitelist ) {
    ......
    }
    ......
    // Additional codes here
}
```

The account of the user 310 reflects a balance of the BCDR after the BCDR is transferred to the user 310. The BCDR is tradable by the user through the exchange server 120. In one embodiment, the BCDR may be traded through the centralized ledger system of the exchange server 120. Additionally, or alternatively, the BCDR may be traded through the exchange server 120 using the blockchain 330. For example, the exchange server 120 may provide pricing information of the asset and match purchase order and sell order of various BCDRs. When an order is matched, the exchange server 120, which manages the private key of various user accounts, may use the private key of the seller of the BCDR sold in the order to sign a transaction and may broadcast the transaction to the network of the blockchain 330 for recordation. Additionally, or alternatively, the BCDR may take the form of a blockchain token that is tradable through at least a second blockchain that is separated from the blockchain 330. In some embodiments, not all blockchains may support a cross-chain transaction. In one case, one of the blockchains that the exchange server 120 participates in may support a cross-chain transaction.

In some embodiments, the BCDRs generated are divisible into a plurality of portions. Each portion may be independently tradable by the user to sell the portion to a different user of the exchange system 120. For example, a BCDR may represent 10 shares of a company stock that are held in trust by the fiduciary server 150. The owner of the BCDR may sell 1/10 of the BCDR, which represents a single share, to a first buyer and the rest of the BCDR to a second buyer. In some cases, the BCDR may represent a single share of company stock. The BCDR is still divisible so that users may trade a portion of a share.

Figure 4B:
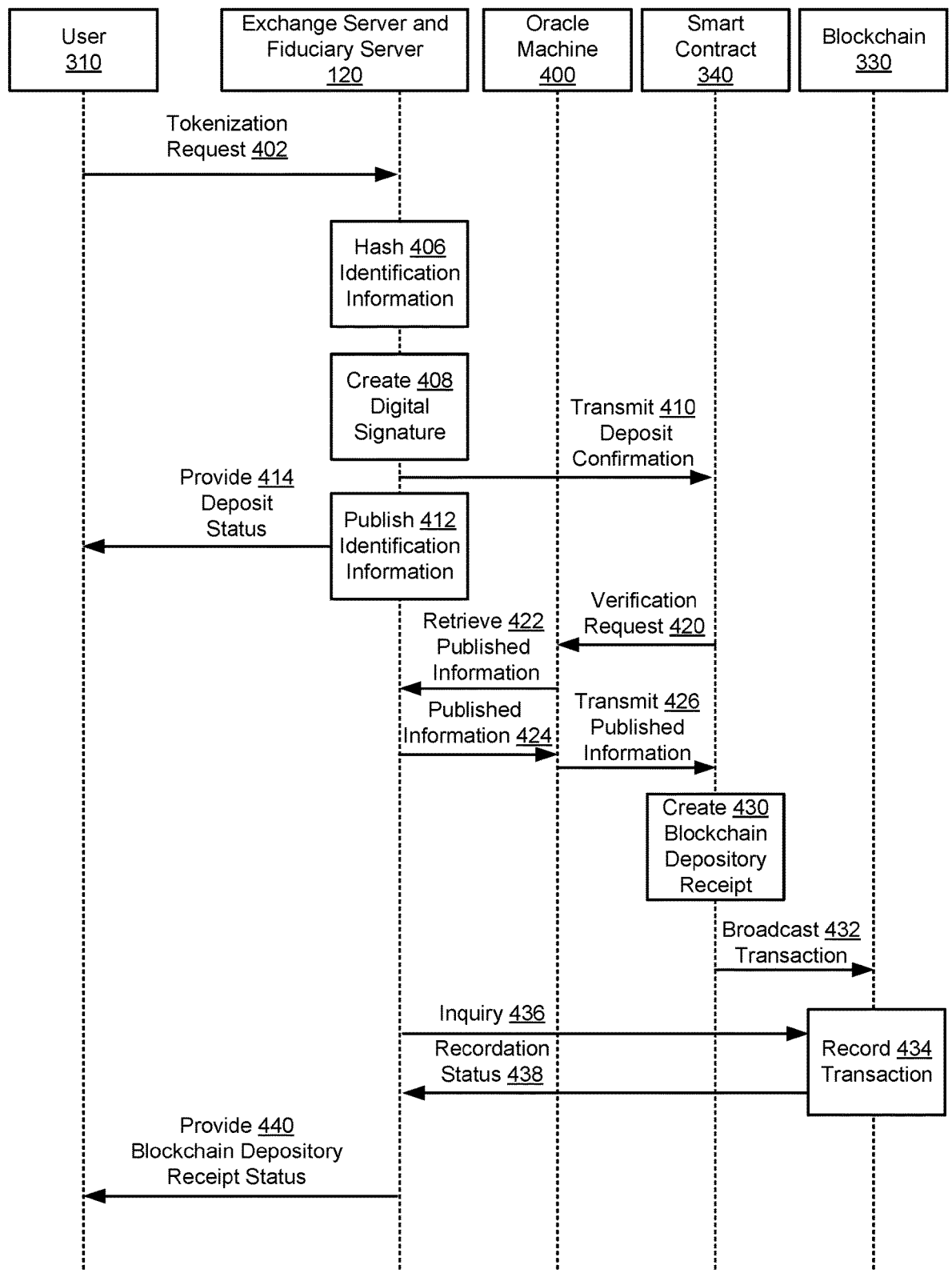
FIG. 4B is a flowchart depicting another example process of tokenizing an asset, in accordance with an embodiment.

FIG. 4B is a flowchart depicting another example process of tokenizing an asset, in accordance with an embodiment. The process is similar to the process shown in FIG. 4A, except the exchange server 120 serves as both the exchange server 120 and the fiduciary server 150. The exchange server 120 serves as a fiduciary to hold assets in trust. The exchange server 120 causes a generation of a digital signature of a fiduciary, which is the exchange server 120 or a component of the exchange server 120. The exchange server 120 also causes a transmission of the digital signature to the smart contract 340 recorded on the blockchain 330. The smart contract 340 includes code instructions that are executable responsive to verifying the digital signature. The code instructions, when executed, cause a computer to generate a BCDR representing that the asset is held in trust by a fiduciary. The details of the process are similar to those shown in FIG. 4A and are not repeated.

Example Redemption Process

Figure 5:
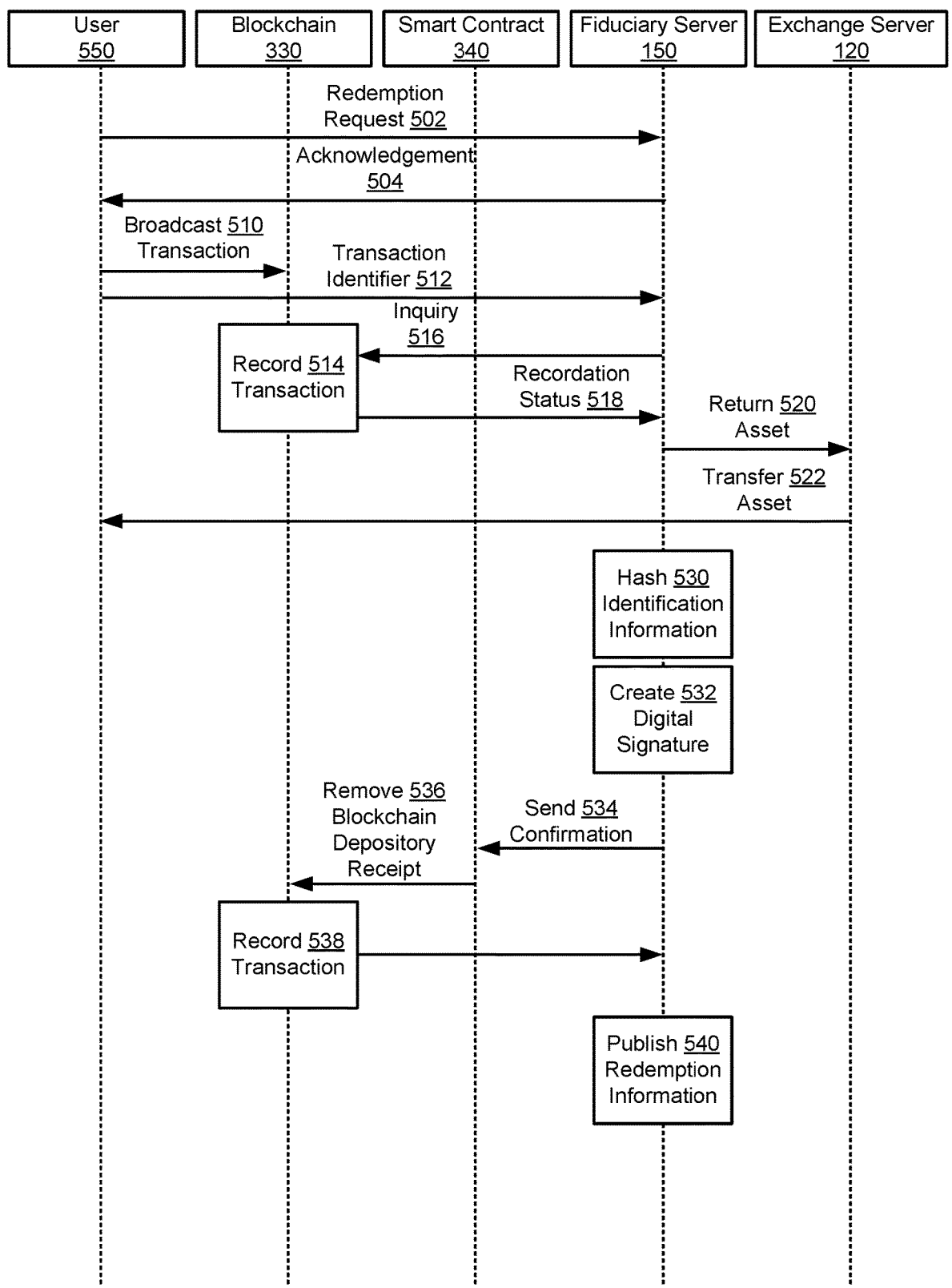
FIG. 5 is a flowchart depicting an example process of redeeming an asset, in accordance with an embodiment.

FIG. 5 is a flowchart depicting an example process of redeeming a tokenized asset from a fiduciary server, in accordance with an embodiment. The fiduciary server 150 may receive a redemption request of a tokenized asset (e.g., in the form of BCDR) from a user 550. The user 550 may be the current owner of the BCDR and may or may not be the original owner (e.g., user 310 shown in FIG. 4A). In response to the redemption request, the fiduciary server 150 may provide an acknowledgment 504. The acknowledgment 504 may include a digital signature of the fiduciary server 150 so that the user 550 can verify the acknowledgment. The acknowledgment 504 may include other information such as the asset identifier, the public address of the fiduciary server 150, the BCDR identifier.

The user 550 broadcasts 510 a blockchain transaction to the network of the blockchain 330 for recordation. The blockchain transaction specifies a transfer of the BCDR owned by the user 550 to the public address of the fiduciary server 150. The user 550 may sign the blockchain transaction using the user's private key to prove the validity of the blockchain transaction. The user 550 may also provide the fiduciary server 150 with a transaction identifier 512 that identifies the broadcasted blockchain transaction.

The blockchain 330 records the blockchain transaction in one of the blocks through the mining process. The fiduciary server 150 or the exchange server 120 may inquire 516 about the recordation status on the blockchain 330. The fiduciary server 150 or the exchange server 120 may retrieve a recordation status 518 from the blockchain 330 by, for example, scanning through different newly generated blocks on the blockchain 330. The fiduciary server 150 may confirm that the BCDR is transferred to the blockchain address of the fiduciary server 150 after multiple subsequent blocks are linked to the block that records the blockchain transaction broadcasted by the user 550.

In response to the confirmation of the transfer of BCDR, the fiduciary server 150 returns 520 an equivalent quantity of the asset that was held in trust to the exchange server 120. The exchanger server 120 in turn transfers 522 the asset to the account of the user 550. The exchange server 120 changes the balance of the account of the user 550 to reflect that the asset is transferred to the user 550.

In addition to returning the asset, the fiduciary server 150 may initiate a process to destroy the BCDR recorded on the blockchain 330. In general, the fiduciary server 150 may cause a smart contract 340 recorded on the blockchain 330 to remove the BCDR from the blockchain 330. By way of example, the fiduciary server 150 hashes the identification information of the redemption process. The identification information of the redemption process may include the asset identifier, a quantity of the asset, and a timestamp of the redemption process. The fiduciary server 150 may create 532 a digital signature of the identification information such as by applying the private key of the fiduciary server 150 to the hashed identification information. The fiduciary server 150 may send 534 a confirmation to the smart contract 340. The confirmation may include the digital signature of the fiduciary server 150. The smart contract 340 verifies the digital signature. In response to verifying the digital signature, the code instructions of the smart contract 340 cause a computer to broadcast a blockchain transaction. The blockchain transaction specifies that the BCDR originally transmitted by the user 550 is to be removed 536 from the blockchain 330 or is to be marked as invalid. The blockchain 330 records the blockchain transaction. After the fiduciary server 150 confirms that the removal of the BCDR is recorded and confirmed on the blockchain 330, the fiduciary server 150 may publish 540 the redemption information on a publication site that is separate from the blockchain 330. For example, the publication site may be a website of the fiduciary server 150 or the exchange server 120. The published information may be anonymized.

Example Exchange Process

Figure 6:
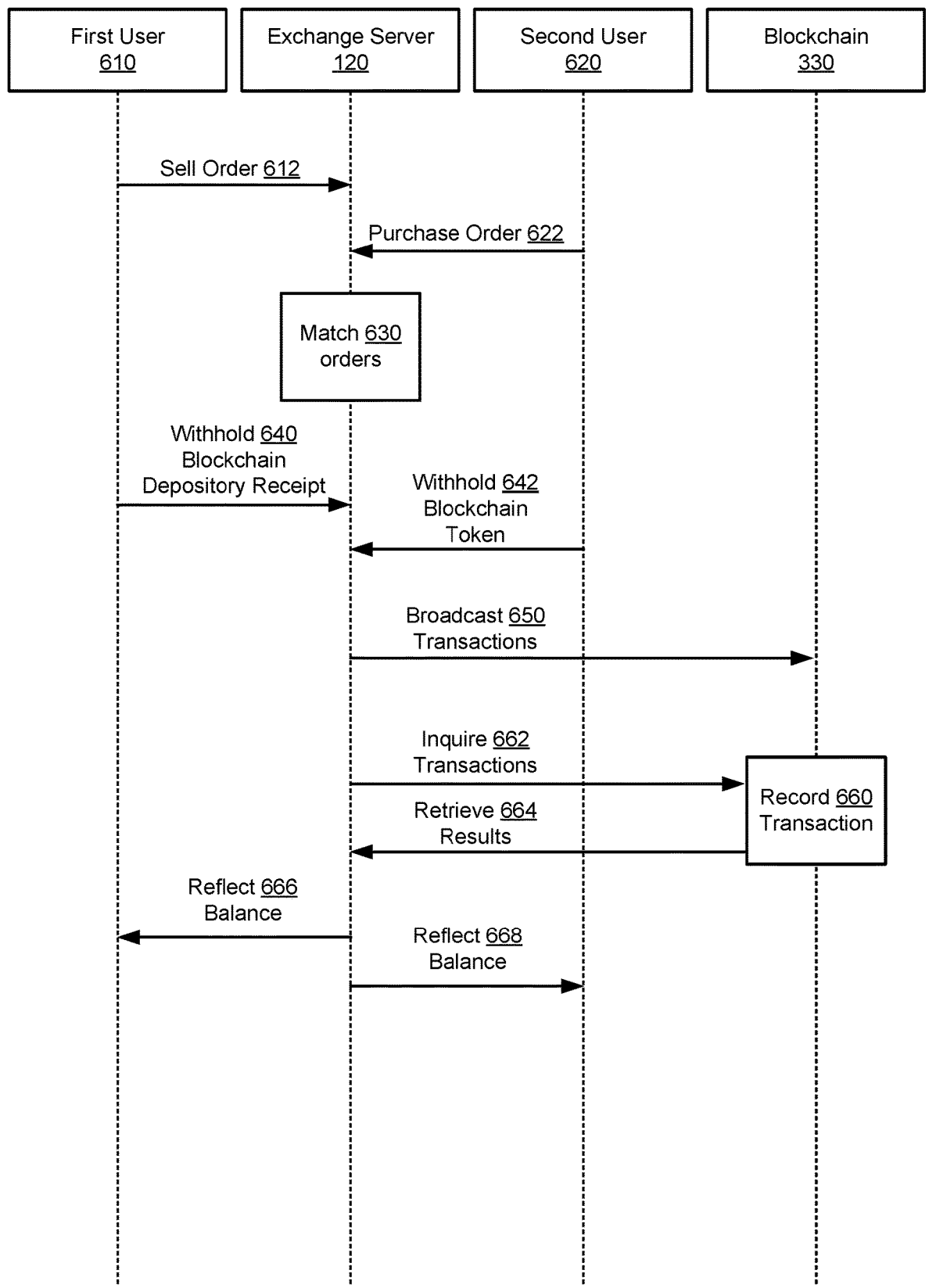
FIG. 6 is a flowchart depicting an example process of exchanging a blockchain depository receipt between users of an exchange server, in accordance with an embodiment.

FIG. 6 is a flowchart depicting an example process of exchanging a BCDR between users of an exchange server 120, in accordance with an embodiment. The exchange server 120 provides pricing information such as price quotes of various assets in different units. For example, for an asset such as a security, the price quote may be both in a fiat currency and in a unit of a blockchain token such as a cryptocurrency. In some cases, the price quote may be in multiple fiat currencies and cryptocurrencies. The assets may be traded in the form of tokenized assets that are represented by BCDRs.

The exchange server 120 match different orders to enable BCDRs to be traded in the exchange server 120. For example, the exchange server 120 may receive from a first user 610 a sell order 612. The sell order 612 specifies an asset in the form of BCDR, the quantity of the asset, and the price to be sold. The price could be in any suitable currency unit. The exchange server 120 may receive from a second user 620 a purchase order 622. The purchase order 622 specifies purchasing the asset in the form of BCDR, the quantity of the asset and the price to be purchased. The purchase order 622 may specify a quantity of the blockchain token as a purchase price. The currency units in the sell order 612 and the purchase order 622 may be different. In such a case, the exchange server 120 applies a conversion rate to convert either or both orders into a common unit. If the purchase price and the sell price match (e.g., at the same price or the purchase price is higher than the sell price), the exchange server 120 may match 630 the orders and begin the exchange of the asset and the currency such as a blockchain token.

The exchange of the ownerships of the tokenized asset owned by the first user 610 and the currency such as blockchain tokens owned by the second user 620 may be performed in different ways in various embodiments. In one embodiment, the exchange server 120 includes a centralized ledger system. The exchange may debit a first account for the first user 610 with the BCDR and credit the account with the quantity of the currency. The exchange server 120 may also credit a second account for the second user 320 with the BCDR and debit the account with the quantity of the currency.

In the embodiment shown in FIG. 6, the exchange server 120 uses a blockchain 330 to exchange the ownerships of the tokenized assets and the currency. As the exchange server 120 matches 630 the sell and purchase orders, the exchange server 120 withholds 640 the BCDR from the first account of the first user 610. Likewise, the exchange server 120 withholds 642 the quantity of currency (e.g., a blockchain token) from the second account of the second user 620. The exchange server 120, which manages the accounts for the first user 610 and second user 620, may hold the private keys for the user accounts. The exchange server 120 may broadcast two different transactions for recordation on one or more blockchains. For example, using the private key of the first account of the first user 610, the server 120 may create a digital signature in a first blockchain transaction and broadcast 650 the first blockchain transaction for recordation on the blockchain 330. The first blockchain transaction specifies a transfer of the BCDR to a blockchain address of the second user 620. The exchange server 120 may also use the private key of the second account of the second user 620 to create a digital signature in a second blockchain transaction and broadcast 650 the second blockchain transaction for recordation on the blockchain 330. The second blockchain transaction specifies a transfer of the quantity of currency (e.g., blockchain token) to a blockchain address of the first user 610. While in FIG. 6 the two blockchain transactions are broadcasted to the same blockchain 330, in other embodiments the two blockchain transactions may be broadcasted to different blockchains.

The blockchain 330 records 660 the broadcasted transactions. The exchange server 120 may inquire 662 about the recordation status of the transactions on the blockchain 330 and retrieve 664 the results from the blockchain 330. After the blockchain transactions are recorded and multi-verified (e.g., a few new blocks are added to the block that records the blockchain transaction), the transaction is settled. The exchange server 120 reflects 666 the balance changes of the first account of the first user 310. Likewise, the exchange server 120 reflects 668 the balance changes of the second account of the second user 320. Before the transactions are settled on the blockchain 330, the exchange server 120 may show that the balances are pending.

Example Blockchain Architecture

Figure 7A:
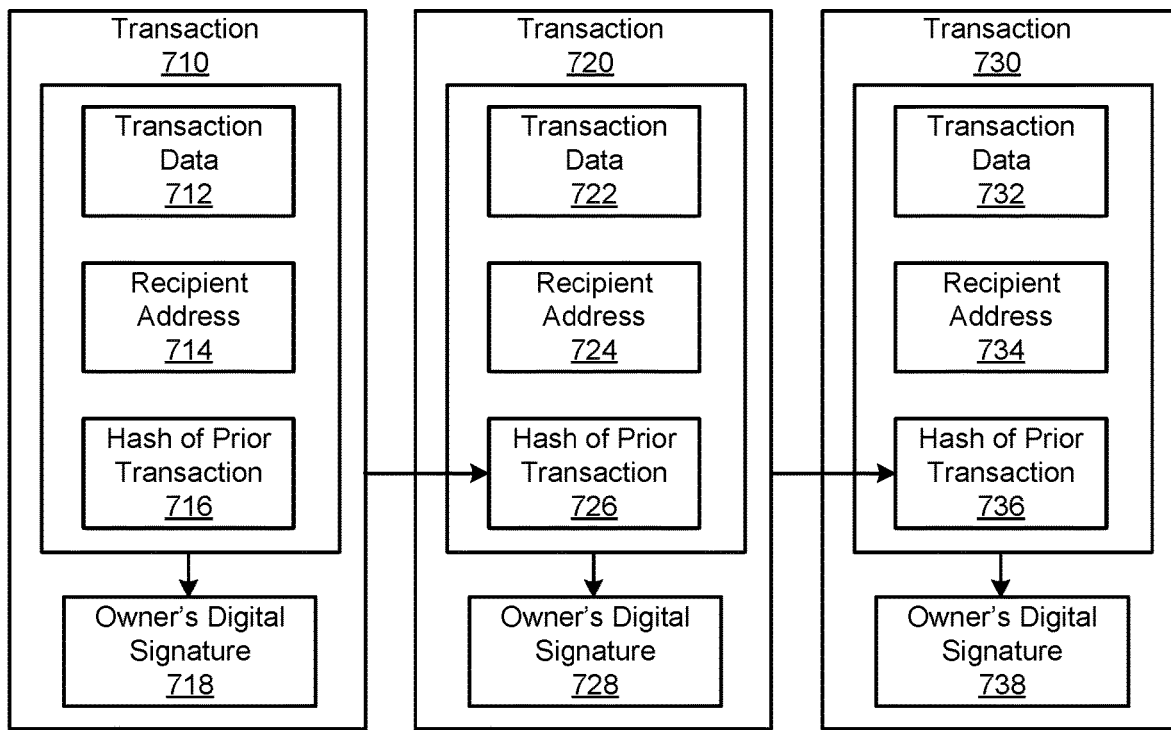
FIG. 7A is a block diagram illustrating a chain of transactions recorded on a blockchain, in accordance with an embodiment.

FIG. 7A is a block diagram illustrating a chain of transactions broadcasted and recorded on a blockchain, in accordance with an embodiment. The transactions described in FIG. 7A may correspond to any of the transactions and the transfer of a blockchain unit (e.g., an electronic coin, a blockchain token, a BCDR, etc.) described in previous figures.

In some embodiment, a blockchain is a distributed system. A distributed blockchain network may include a plurality of nodes. Each node is a user or a server that participates in the blockchain network. In a completely public blockchain, any participant may become a node of the blockchain. The nodes collectively may be used as a distributed computing system that serves as a virtual machine of the blockchain. In some embodiments, the virtual machine or a distributed computing system may be simply referred to as a computer. Any users of a public blockchain may broadcast transactions for the nodes of the blockchain to record. Each user's digital wallet is associated with a cryptographic private key that is used to sign transactions and prove the ownership of a blockchain unit.

The ownership of a blockchain unit may be traced through a chain of transactions. In FIG. 7A, a chain of transactions may include a first transaction 710, a second transaction 720, and a third transaction 730, etc. Each of the transactions in the chain may have a fairly similar structure except the very first transaction in the chain. The first transaction of the chain may be generated by a smart contract and may be traced back to the smart contract that is recorded on the blockchain. While each transaction is linked to a prior transaction in FIG. 7A, the transaction does not need to be recorded on consecutive blocks on the blockchain. For example, the block recording the transaction 710 and the block recording the transaction 720 may be separated by hundreds or even thousands of blocks. The traceback of the prior block is tracked by the hash of the prior block that is recorded by the current block.

Referring to one of the transactions in FIG. 7A, for illustration, the transaction 720 may be referred to as a current transaction. Transaction 710 may be a prior transaction and transaction 730 may be referred to a subsequent transaction. Each transaction includes a transaction data 722, a recipient address 724, a hash of the prior transaction 726, and the current transaction's owner's digital signature 728. The transaction data 722 records the substance of the current transaction 720. For example, the transaction data 722 may specify a transfer of a quantity of a blockchain unit (e.g., an electronic coin, a blockchain token, a BCDR, etc.). In some embodiments, the transaction data 722 may include code instructions of a smart contract.

The recipient address 724 is a version of the public key that corresponds to the private key of the digital wallet of the recipient. In one embodiment, the recipient address 724 is the public key itself. In another embodiment, the recipient address 724 an encoded version of the public key through one or more functions such as some deterministic functions. For example, the generation of the recipient address 724 from the public key may include hashing the public key, adding a checksum, adding one or more prefixes or suffixes, and encoding the resultant bits. The recipient address 724 may be a unique identifier of the digital wallet of the recipient on the blockchain.

The hash of the prior transaction 726 is the hash of the entire transaction data of the prior transaction 710. Likewise, the hash of the prior transaction 736 is the hash of the entire transaction data of the transaction 720. The hashing of the prior transaction 710 may be performed using a hashing algorithm such as a secure hash algorithm (SHA) or a message digest algorithm (MD). In some embodiments, the owner corresponding to the current transaction 720 may also use the public key of the owner to generate the hash. The hash of prior transaction 726 provides a traceback of the prior transaction 710 and also maintains the data integrity of the prior transaction 710.

In generating a current transaction 720, the digital wallet of the current owner of the blockchain unit uses its private key to encrypt the combination of the transaction data 722, the recipient address 724, and the hash of prior transaction 726 to generate the owner's digital signature 728. To generate the current transaction 720, the current owner specifies a recipient by including the recipient address 724 in the digital signature 728 of the current transaction 720. The subsequent owner of the blockchain unit is fixed by the recipient address 724. In other words, the subsequent owner that generates the digital signature 738 in the subsequent block 730 is fixed by the recipients address 724 specified by the current transaction 720. To verify the validity of the current transaction 720, any nodes in the blockchain network may trace back to the prior transaction 710 (by tracing the hash of prior transaction 726) and locate the recipient address 714. The recipient address 714 corresponds to the public key of the digital signature 728. Hence, the nodes in the blockchain network may use the public key to verify the digital signature 728.

The transfer of ownership of a blockchain unit may continue by the owner of the blockchain unit. To transfer the ownership, the owner may broadcast the transaction that includes the digital signature of the owner and a hash of the prior transaction. A valid transaction with a verifiable digital signature and a correct hash of the prior transaction will be recorded in a new block of the blockchain through the mining process.

Figure 7B:
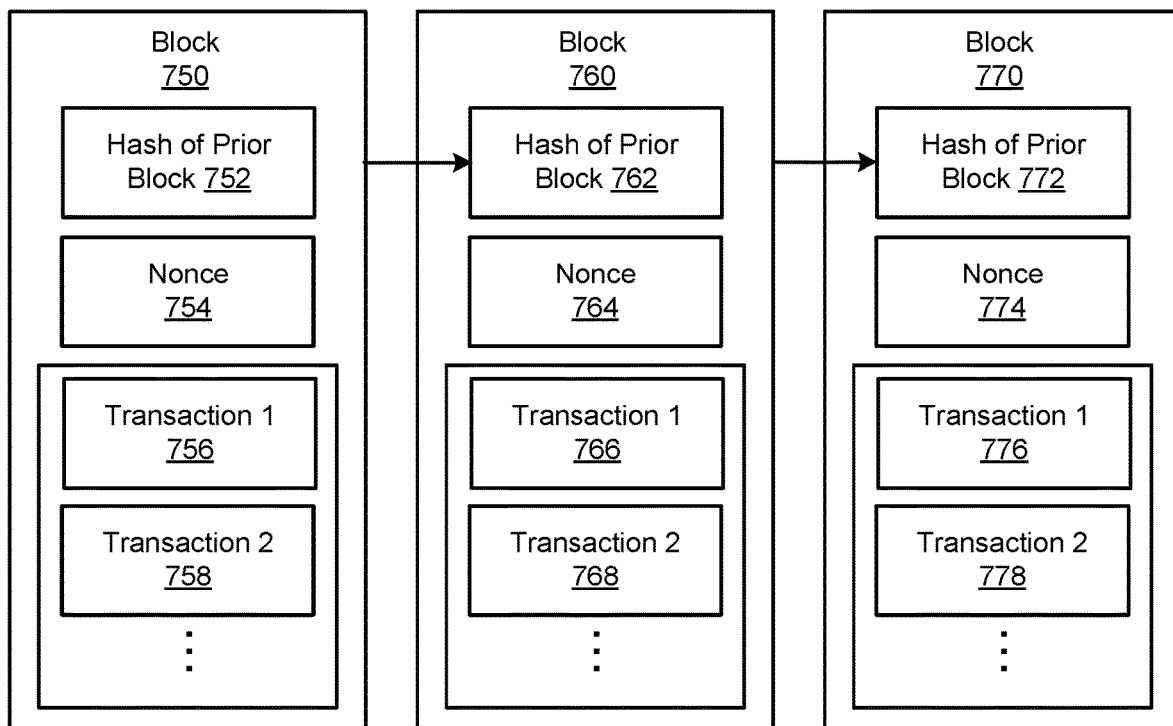
FIG. 7B is a block diagram illustrating a connection of multiple blocks in a blockchain, in accordance with an embodiment.

FIG. 7B is a block diagram illustrating a connection of multiple blocks in a blockchain, in accordance with an embodiment. Each block of a blockchain, except the very first block which may be referred to as the genesis block, may have a similar structure. The blocks 750, 760, and 760 may each include a hash of the prior blockchain 752, a nonce 754, and a plurality of transactions (e.g., a first transaction 756, a second transaction 758, etc.). Each transaction may have the structure shown in FIG. 7A.

In a block generation process, a new block may be generated through mining or voting. For a mining process of a blockchain, any nodes in the blockchain system may participate in the mining process. The generation of the hash of the prior block may be conducted through a trial and error process. The entire data of the prior block (or a version of the prior block such as a simplified version) may be hashed using the nonce as a part of the input. The blockchain may require a certain format in the hash of prior block in order for the new block to be recognized by the nodes as valid. For example, in one embodiment, the hash of the prior block needs to start with a certain number of zeroes in the hash. Other criteria of the hash of the prior block may also be used, depending on the implementation of the blockchain.

In a voting process, the nodes in a blockchain system may votes to determine the content of a new blocks. Depending on the embodiment, a selected subset of nodes or all nodes in the blockchain system may participate in the votes. When there are multiple candidate new blocks that include different transactions are available, the nodes will vote for one of the blocks to be linked to the existing block. The voting may be based on the voting power of the nodes. In one embodiment, the nodes may have equal voting power in each round. In another embodiment, one or more voting tokens may be distributed to one or more nodes. The holders of the voting tokens in a particular round may have more voting power for the round. After one or more rounds, the voting tokens may be passed to other nodes. For example, the passing of the voting tokens may be determined randomly. The use of a voting process to generate block, which is also a decentralized process, may allow a large number of transactions to be recorded in a short period of time and avoid the delay in the mining process By way of example of a block generation process using mining, in generating the hash of prior block 762, a node may randomly combine a version of the prior block 750 with a random nonce to generate a hash. The generated hash is somewhat a random number due to the random nonce. The node compares the generated hash with the criteria of the blockchain system to check if the criteria are met (e.g., whether the generated hash starts with a certain number of zeroes in the hash). If the generated hash fails to meet the criteria, the node tries another random nonce to generate another hash. The process is repeated for different nodes in the blockchain network until one of the nodes find a hash that satisfies the criteria. The nonce that is used to generate the satisfactory hash is the nonce 764. The node that first generates the hash 762 may also select what transactions that are broadcasted to the blockchain network is to be included in the block 760. The node may check the validity of the transaction (e.g., whether the transaction can be traced back to a prior recorded transaction and whether the digital signature of the generator of the transaction is valid). The selection may also depend on the number of broadcasted transactions that are pending to be recorded and also the fees that may be specified in the transactions. For example, in some embodiments, each transaction may be associated with a fee (e.g., a gas) for having the transaction recorded. After the transactions are selected and the data of the block 760 is fixed, the nodes in the blockchain network repeat the trial and error process to generate the hash of prior block 772 by trying different nonce. In embodiments that use voting to generate new blocks, a nonce may not be needed. A new block may be linked to the prior block by including the hash of the prior block.

New blocks may be continued to be generated through the block generation process. A transaction of a blockchain unit (e.g., an electronic coin, a blockchain token, a BCDR, etc.) is complete when the broadcasted transaction is recorded in a block. In some embodiment, the transaction is considered settled when the transaction is multi-verified. A transaction is multi-verified when there are multiple subsequent blocks generated and linked to the block that records the transaction.

In some embodiments, some of the transactions 756, 758, 766, 768, 776, 778, etc. may include one or more smart contracts. The code instructions of the smart contracts are recorded may be recorded in the block and are often immutable. When conditions are met, the code instructions of the smart contract are triggered. The code instructions may cause a computer (e.g., a virtual machine of the blockchain) to carry out some actions such as generating a blockchain unit and broadcasting a transaction documenting the generation to the blockchain network for recordation.

Computing Machine Architecture

Figure 8:
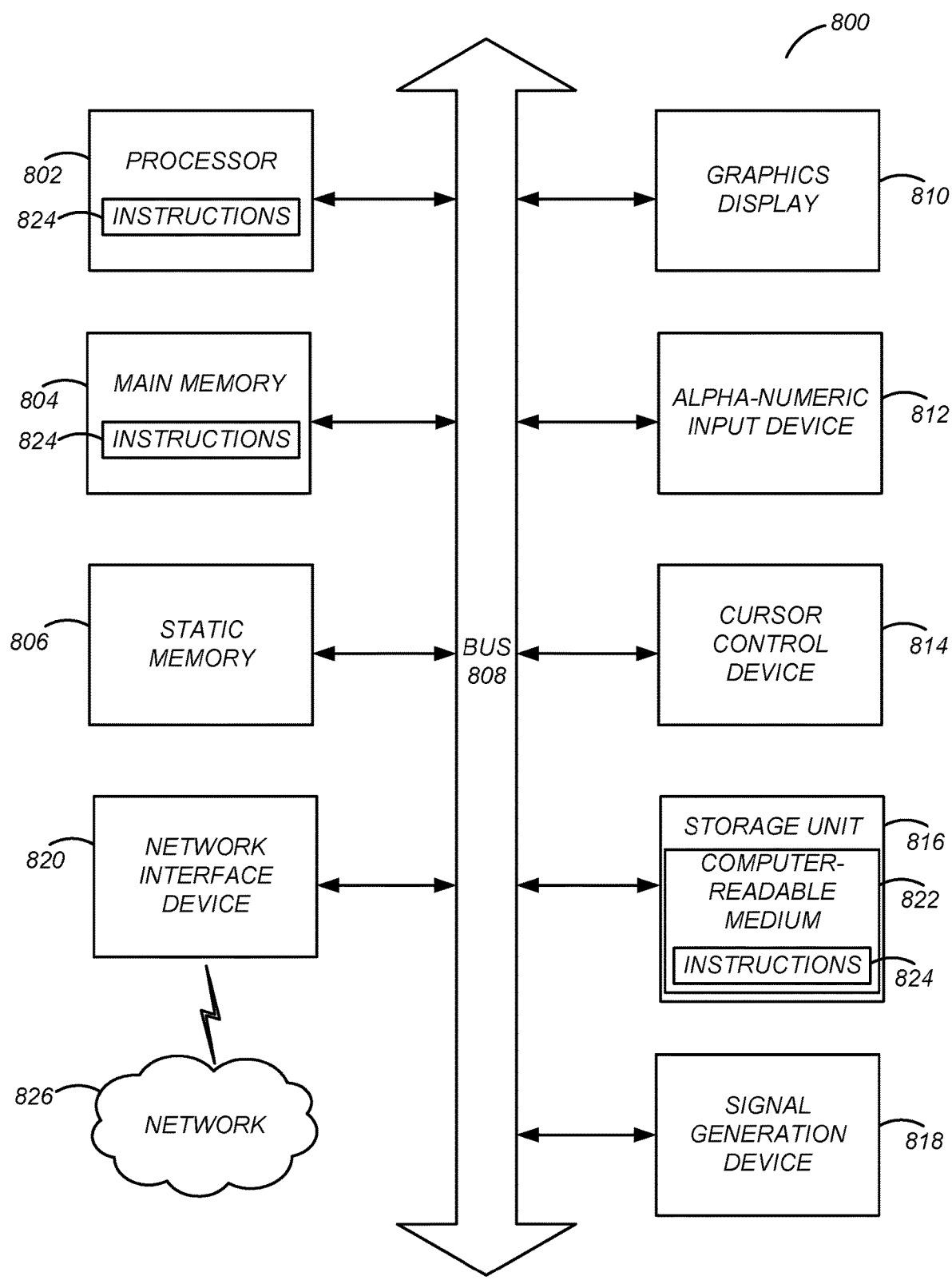
FIG. 8 is a block diagram illustrating an example computing device, in accordance with an embodiment.

FIG. 8 is a block diagram illustrating components of an example computing machine that is capable of reading instructions from a computer-readable medium and execute them in a processor (or controller). A computer described herein may include a single computing machine shown in FIG. 8, a virtual machine, a distributed computing system that includes multiples nodes of computing machines shown in FIG. 8, or any other suitable arrangement of computing devices.

By way of example, FIG. 8 shows a diagrammatic representation of a computing machine in the example form of a computer system 800 within which instructions 824 (e.g., software, program code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 8 may correspond to any software, hardware, or combined components shown in FIGS. 1 and 2, including but not limited to, the user device 110, the exchange server 120, the fiduciary server 150, a node of a blockchain network, and various engines, interfaces, terminals, and machines shown in FIG. 2. While FIG. 8 shows various hardware and software elements, each of the components described in FIGS. 1 and 2 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 824 that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes one or more processors (generally, processor 802) (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 804, and a static memory 806, which are configured to communicate with each other via a bus 808. The computer system 800 may further include graphics display unit 810 (e.g., a plasma display panel (PDP), a liquid crystal display (LCD), a projector, or a cathode ray tube (CRT)). The computer system 800 may also include alphanumeric input device 812 (e.g., a keyboard), a cursor control device 814 (e.g., a mouse, a trackball, a joystick, a motion sensor, or other pointing instrument), a storage unit 816, a signal generation device 818 (e.g., a speaker), and a network interface device 820, which also are configured to communicate via the bus 808.

The storage unit 816 includes a computer-readable medium 822 on which is stored instructions 824 embodying any one or more of the methodologies or functions described herein. The instructions 824 may also reside, completely or at least partially, within the main memory 804 or within the processor 802 (e.g., within a processor's cache memory) during execution thereof by the computer system 800, the main memory 804 and the processor 802 also constituting computer-readable media. The instructions 824 may be transmitted or received over a network 826 via the network interface device 820.

While computer-readable medium 822 is shown in an example embodiment to be a single medium, the term "computer-readable medium" should be taken to include a single medium or multiple media (e.g., a centralized or distributed database, or associated caches and servers) able to store instructions (e.g., instructions 824). The computer-readable medium may include any medium that is capable of storing instructions (e.g., instructions 824) for execution by the machine and that cause the machine to perform any one or more of the methodologies disclosed herein. The computer-readable medium may include, but not be limited to, data repositories in the form of solid-state memories, optical media, and magnetic media. The computer-readable medium does not include a transitory medium such as a signal or a carrier wave.

Additional Configuration Considerations

Certain embodiments are described herein as including logic or a number of components, engines, modules, or mechanisms, for example, as illustrated in FIG. 2. Engines may constitute either software modules (e.g., code embodied on a computer-readable medium) or hardware modules. A hardware engine is a tangible unit capable of performing certain operations and may be configured or arranged in a certain manner. In example embodiments, one or more computer systems (e.g., a standalone, client or server computer system) or one or more hardware engines of a computer system (e.g., a processor or a group of processors) may be configured by software (e.g., an application or application portion) as a hardware engine that operates to perform certain operations as described herein.

In various embodiments, a hardware engine may be implemented mechanically or electronically. For example, a hardware engine may comprise dedicated circuitry or logic that is permanently configured (e.g., as a special-purpose processor, such as a field programmable gate array (FPGA) or an application-specific integrated circuit (ASIC)) to perform certain operations. A hardware engine may also comprise programmable logic or circuitry (e.g., as encompassed within a general-purpose processor or another programmable processor) that is temporarily configured by software to perform certain operations. It will be appreciated that the decision to implement a hardware engine mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 802, that are temporarily configured (e.g., by software) or permanently configured to perform the relevant operations. Whether temporarily or permanently configured, such processors may constitute processor-implemented engines that operate to perform one or more operations or functions. The engines referred to herein may, in some example embodiments, comprise processor-implemented engines.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Upon reading this disclosure, those of skill in the art will appreciate still additional alternative structural and functional designs for a similar system or process through the disclosed principles herein. Thus, while particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation and details of the method and apparatus disclosed herein without departing from the spirit and scope defined in the appended claims.

What is claimed is:

1. A computer-implemented method for secure tokenized data structures in a blockchain system, the method comprising:
  receiving, from a user of an exchange server and over a computer network, a tokenization request for tokenizing a quantity of a security;
  generating, by a computer, a digital signature of a fiduciary using a cryptographic private key of the fiduciary, the digital signature derived from identification information of the tokenization request, the identification information comprising an identifier of the security, the digital signature representing that the fiduciary holds the quantity of the security in trust;
  recording the digital signature on a first blockchain data structure;
  transmitting, over the computer network, published information to a publication source that is separate from the first blockchain data structure, the published information comprising the identification information or information derived from the identification information; and
  executing a smart contract on the first blockchain data structure to verify the digital signature, wherein:
    verifying the digital signature comprises decrypting the digital signature using a public key of the fiduciary, the public key and the private key forming a public-private key pair, comparing decrypted information in the digital signature to the tokenization request, and comparing the decrypted information in the digital signature to the published information;

the smart contract comprises code instructions that are executable responsive to verification of the digital signature, the code instructions being configured to, when executed, cause the computer to generate a blockchain depository receipt representing the security; and the blockchain depository receipt is exchangeable by the user through the exchange server.

2. The computer-implemented method of claim 1, wherein the code instructions, when executed, further cause the computer to broadcast a blockchain transaction for recordation on the first blockchain data structure, the blockchain transaction specifying a transfer of the blockchain depository receipt to a blockchain address of the user in the first blockchain data structure.

3. The computer-implemented method of claim 1, wherein the identification information of the tokenization request is generated by:

creating a hash of combined information comprising an account identifier of the user, the quantity of the security, the identifier of the security, and a timestamp of the tokenization request, the hash being the identification information.

4. The computer-implemented method of claim 1, wherein the code instructions of the smart contract define a namespace that is reserved for the exchange server, and the blockchain depository receipt is issued under the namespace, wherein the blockchain depository receipt is tradable only through the exchange server.

5. The computer-implemented method of claim 1, wherein the blockchain depository receipt is a blockchain token that is tradable through at least a second blockchain data structure separate from the first blockchain data structure.

6. The computer-implemented method of claim 1, wherein the blockchain depository receipt is divisible into a plurality of portions, each portion being independently tradable by the user to sell the portion to a different user of the exchange server.

7. The computer-implemented method of claim 1, wherein the blockchain depository receipt is tradable by:

providing, by the exchange server, pricing information of the security in a unit of a blockchain token;

matching, by the exchange server, a sell order of the blockchain depository receipt with a purchase order in a quantity of the blockchain token; and exchanging, by the exchange server, ownerships of the blockchain depository receipt and the quantity of the blockchain token.

8. The computer-implemented method of claim 1, wherein the blockchain depository receipt is redeemable by:

receiving the blockchain depository receipt from an owner of the blockchain depository receipt;

transmitting an equivalent quantity of the security to an account of the exchange server, the account belonging to the owner; and causing the smart contract recorded on the first blockchain data structure to remove the blockchain depository receipt from the first blockchain data structure.

9. A blockchain system for secure tokenized data structures comprising:

an exchange server configured to:

receive a tokenization request for tokenizing a quantity of a security from a user of the exchange server, and generate a digital signature of a fiduciary, the generation of the digital signature comprising applying a cryptographic private key of the fiduciary to identification information of the tokenization request, the identification information comprising an identifier of the security, the digital signature representing that the fiduciary holds the quantity of the security in trust; and record the digital signature on a blockchain data structure;

the blockchain data structure comprising a block recording a smart contract, the smart contract comprising code instructions that are executable responsive to verifying the digital signature transmitted from the fiduciary, wherein verifying the digital signature comprises:

decrypting the digital signature using a public key of the fiduciary, the public key and the private key forming a public-private key pair;

comparing decrypted information in the digital signature to the tokenization request; and comparing the decrypted information in the digital signature to published information retrieved from a publication source that is separate from the blockchain data structure, the published information comprising the identification information or information derived from the identification information; and wherein:

the code instructions, when executed, cause a computer to generate a blockchain depository receipt representing the security, wherein the blockchain depository receipt is exchangeable by the user through the exchange server.

10. The system of claim 9, wherein the code instructions, when executed, further cause the computer to broadcast a blockchain transaction for recordation on the blockchain data structure, the blockchain transaction specifying a transfer of the blockchain depository receipt to a blockchain address of the user in the blockchain data structure.

11. The system of claim 9, wherein the identification information of the tokenization request is generated by:

creating a hash of combined information comprising an account identifier of the user, the quantity of the security, the identifier of the security, and a timestamp of the tokenization request, the hash being the identification information.

12. The system of claim 9, wherein the blockchain data structure restricts transactions of the blockchain depository receipt to accounts of the exchange server.

13. The system of claim 9, wherein the code instructions of the smart contract define a namespace that is reserved for the exchange server, and the blockchain depository receipt is issued under the namespace, whereby the blockchain depository receipt is tradable only through the exchange server.

14. The system of claim 9, wherein the blockchain depository receipt is a blockchain token that is tradable through at least a second blockchain data structure separate from the blockchain data structure.

15. The system of claim 9, wherein the exchange server is further configured to provide pricing information of the security in a unit of a blockchain token.

16. The system of claim 9, wherein the exchange server is further configured to:

receive a sell order from the user of the exchange server, the sell order specifying the blockchain depository receipt to be sold, receive a purchase order from another user of the exchange server, the purchase order specifying a quantity of a blockchain token, match the sell order and the purchase order, and exchange ownerships of the blockchain depository receipt and the quantity of the blockchain token.

17. A blockchain system for secure tokenized data structures comprising:

an exchange server configured to receive a tokenization request for tokenizing a quantity of a security from a user of the exchange server; and a fiduciary having an account of the exchange server, the fiduciary configured to:

hold the quantity of the security in trust, apply a cryptographic private key of the fiduciary to identification information of the tokenization request to generate a digital signature of the fiduciary, the identification information comprising an identifier of the security, the digital signature representing that the fiduciary holds the quantity of the security in trust, record the digital signature on a blockchain data structure, wherein a smart contract is recorded on the blockchain data structure, the smart contract comprising code instructions that are executable responsive to verifying the digital signature, and transmit published information to a publication source that is separate from the first blockchain data structure, the published information comprising the identification information or information derived from the identification information, wherein verifying the digital signature comprises:

decrypting the digital signature using a public key of the fiduciary, the public key and the private key forming a public-private key pair;

comparing decrypted information in the digital signature to the tokenization request; and comparing the decrypted information in the digital signature to the published information; and wherein; the code instructions, when executed, cause a computer to generate a blockchain depository receipt representing the security, wherein the blockchain depository receipt is exchangeable by the user through the exchange server.

18. The computer-implemented method of claim 7, wherein exchanging ownerships of the blockchain depository receipt and the quantity of blockchain token comprises transferring ownership of the blockchain depository receipt to a second user, and the transferring comprises:

debiting a first account of the exchange server for the user with the blockchain depository receipt; and crediting a second account of the exchange server for the second user with the blockchain depository receipt.

19. The computer-implemented method of claim 7, wherein exchanging ownerships of the blockchain depository receipt and the quantity of blockchain token comprises transferring the ownership of the blockchain depository receipt to a second user, and the transferring comprises:

broadcasting a blockchain transaction for recordation on the blockchain data structure, the blockchain transaction specifying a transfer of the blockchain depository receipt from a first blockchain address of the user to a second blockchain address of the second user.

* * * * *